United States Patent
Miyamoto

(10) Patent No.: US 10,435,305 B2
(45) Date of Patent: Oct. 8, 2019

(54) METHOD FOR PRODUCING MONOLITHIC POROUS BODY COMPRISING TITANIA

(71) Applicant: SnG INC., Kyoto (JP)

(72) Inventor: Riichi Miyamoto, Kyoto (JP)

(73) Assignee: SNG INC., Kyoto (JP)

( * ) Notice: Subject to any disclaimer, the term of this patent is extended or adjusted under 35 U.S.C. 154(b) by 15 days.

(21) Appl. No.: 15/551,887

(22) PCT Filed: Feb. 24, 2016

(86) PCT No.: PCT/JP2016/055408
§ 371 (c)(1),
(2) Date: Aug. 17, 2017

(87) PCT Pub. No.: WO2016/136799
PCT Pub. Date: Sep. 1, 2016

(65) Prior Publication Data
US 2018/0037468 A1 Feb. 8, 2018

(30) Foreign Application Priority Data
Feb. 26, 2015 (JP) .................. 2015-037404

(51) Int. Cl.
*C01G 23/053* (2006.01)
*C04B 35/46* (2006.01)
(Continued)

(52) U.S. Cl.
CPC ............ *C01G 23/053* (2013.01); *C04B 35/46* (2013.01); *C04B 35/624* (2013.01); *C04B 38/0045* (2013.01); *C04B 2235/441* (2013.01)

(58) Field of Classification Search
CPC ..... C01G 23/053; C04B 35/46; C04B 35/624; C04B 38/0045
See application file for complete search history.

(56) References Cited

U.S. PATENT DOCUMENTS

| 8,460,547 B2 * | 6/2013 | Sun ................ A61K 9/0092 210/263 |
| 2003/0068266 A1 * | 4/2003 | Wang ............... C03B 19/12 423/338 |

(Continued)

FOREIGN PATENT DOCUMENTS

| EP | 2816012 A1 | 12/2014 |
| JP | 2008532898 A | 8/2008 |

(Continued)

OTHER PUBLICATIONS

Hasegawa et al (Facile Preparation of Hierarchically Porous TiO2 Monoliths, J. Am. Ceram. Soc. 93 (2010) pp. 3110-3115). (Year: 2010).*

(Continued)

*Primary Examiner* — Melvin C. Mayes
*Assistant Examiner* — Michael Forrest
(74) *Attorney, Agent, or Firm* — Haynes Beffel & Wolfeld LLP

(57) ABSTRACT

Provided is a producing method that makes it possible to stably manufacture a homogeneous titania monolithic porous body by a sol-gel method using various titanium alkoxides as a titanium precursor. The method comprises the steps of; preparing a titanium precursor solution by mixing a titanium alkoxide other than titanium methoxide, which is a titanium precursor, and a first anion source in an organic solvent; preparing a sol by adding water or an aqueous solution containing a second anion source to the titanium precursor solution; forming a co-continuous structure of a titania hydrogel phase and a solvent phase by subjecting the sol to sol-gel transition and phase separation in parallel; and removing the solvent phase from the co-continuous structure, in which a temperature lower than the boiling point of the compound having the lowest boiling point present in the titanium precursor solution is maintained in the first three (Continued)

steps, and in which a blending amount of the first anion source or that of the first and the second anion sources is set such that a molar ratio of the first anion source or a molar ratio of the first and the second anion sources in total to the titanium precursor is equal to or higher than 1.05.

11 Claims, 10 Drawing Sheets

(51) Int. Cl.
  *C04B 35/624* (2006.01)
  *C04B 38/00* (2006.01)

(56) References Cited

U.S. PATENT DOCUMENTS

| | | | |
|---|---|---|---|
| 2009/0123358 | A1 | 5/2009 | Costa et al. |
| 2013/0241097 | A1 | 9/2013 | Ippommatsu et al. |
| 2015/0037236 | A1 | 2/2015 | Kageyama et al. |

FOREIGN PATENT DOCUMENTS

| | | |
|---|---|---|
| JP | 4874976 B2 | 2/2012 |
| JP | 2012111655 A | 6/2012 |
| JP | 2014148456 A | 8/2014 |
| WO | 2007021037 A1 | 2/2007 |
| WO | 2013121801 A1 | 8/2013 |

OTHER PUBLICATIONS

Extended Search Report from EP16755543.2 dated Feb. 21, 2018, 8 pages.

Kitada et al, "Selective Preparation of Macroporous Monoliths of Conductive Titanium Oxides TinO2n-1 (n=2,3,4,6 )," Journal of the American Chemical Society, vol. 134, No. 26, Jul. 4, 2012, pp. 10894-10898.

Cabooter, et al. "Detailed characterization of the kinetic performance of first and second generation silica monolithic columns for reversed-phase chromatography separations," J. Chromatography A, vol. 1325, Jan. 17, 2014, pp. 72-82.

Hasegawa et al., "Facile Preparation of Hierarchically Porous TiO2 Monoliths," J. Amer. Ceramic Soc. 93(10) Oct. 2010 (first published May 20, 2010) pp. 3110-3115.

Hasegawa, et al., "Facile preparation of transparent monolithic titania gels utilizing a chelating ligand and mineral salts," J. Sol-Gel Science and Technology, 53(1), Jan. 2010, pp. 59-66.

\* cited by examiner

| | Titanium Precursor | Organic Solvent | Anion Source 1A | Anion Source 1B | Water | Phase Separation Inducer |
|---|---|---|---|---|---|---|
| Example 1 | A1/5mL | B1/3.4mL | C1/2.1mL | None | 1mL | None |
| Example 2 | A1/5mL | B1/3.4mL | C1/2.2mL | None | 1mL | None |
| Example 3 | A1/5mL | B1/3mL | C1/2.5mL | None | 1mL | None |
| Example 4 | A1/5mL | B1/2.5mL | C1/3mL | None | 1mL | None |
| Example 5 | A1/5mL | B1/2mL | C1/3.5mL | None | 1mL | None |
| Example 6 | A1/5mL | B1/1.5mL | C1/4mL | None | 1mL | None |
| Example 7 | A1/5mL | B1/1mL | C1/4.5mL | None | 1mL | None |
| Example 8 | A1/5mL | B1/0.5mL | C1/5mL | None | 1mL | None |
| Example 9 | A1/50mL | B1/35mL | C1/20mL | C3/0.8g | 10mL | None |
| Example 10 | A1/50mL | B1/35mL | C1/20mL | C3/0.8g | 10mL | None |
| Example 11 | A1/5mL | B1/3.5mL | C1/2mL | C4/1.08g | 1mL | None |
| Example 12 | A1/5mL | B1/5.5mL | C2/2.92mL | None | 1mL | None |
| Example 13 | A1/5mL | None | C1/5.5mL | None | 1mL | None |
| Example 14 | A1/5mL | None | C1/5.5mL | None | 1mL | None |
| Example 15 | A1/50mL | B1/35mL | C1/20mL | C3/0.8g | 10mL | D/2.5g |
| Example 16 | A1/50mL | B1/35mL | C1/20mL | C3/0.8g | 10mL | D/3g |
| Example 17 | A1/50mL | B2/35mL | C1/20mL | C3/0.8g | 10mL | D/2g |
| Example 18 | A2/5mL | B1/3.375mL | C1/2.125mL | None | 1mL | None |
| Example 19 | A2/5mL | B1/3.25mL | C1/2.25mL | None | 1mL | None |
| Example 20 | A2/5mL | B1/3mL | C1/2.5mL | None | 1mL | None |
| Example 21 | A2/5mL | B1/2.5mL | C1/3mL | None | 1mL | None |
| Example 22 | A3/5mL | B1/2.85mL | C1/2.65mL | None | 1mL | None |
| Example 23 | A3/5mL | B1/2.7mL | C1/2.8mL | None | 1mL | None |
| Example 24 | A3/5mL | B1/2.3mL | C1/3.2mL | None | 1mL | None |
| Example 25 | A3/5mL | B1/1.5mL | C1/3.8mL | None | 1mL | None |
| Comparative Example 1 | A1/5mL | B1/4.5mL | C1/1mL | None | 1mL | None |
| Comparative Example 2 | A1/5mL | B1/4mL | C1/1.5mL | None | 1mL | None |
| Comparative Example 3 | A1/5mL | B1/3.5mL | C1/2mL | None | 1mL | None |
| Comparative Example 4 | A1/5mL | B1/3.4mL | C1/2.2mL | None | 1mL | None |
| Comparative Example 5 | A1/50mL | B1/35mL | C1/20mL | C3/0.8g | 10mL | None |
| Comparative Example 6 | A1/5mL | None | None | None | 1mL | None |
| Comparative Example 7 | A1/5mL | None | C1/5.5mL | None | 1mL | None |
| Comparative Example 8 | A1/50mL | B2/35mL | C1/20mL | C3/0.8g | 10mL | D/2g |
| Comparative Example 9 | A2/5mL | B1/3.5mL | C1/2mL | None | 1mL | None |
| Comparative Example 10 | A2/5mL | B1/2.5mL | C1/3mL | None | 1mL | None |
| Comparative Example 11 | A2/5mL | B1/2.5mL | C1/3mL | None | 1mL | None |
| Comparative Example 12 | A3/5mL | B1/3mL | C1/2.5mL | None | 1mL | None |

A1: titanium isopropoxide, A2: titanium n-propoxide, A3: titanium ethoxide
B1: 1-propanol, B2: methanol
C1: ethyl acetoacetate, C2: acetic acid, C3: ammonium nitrate, C4: tetraethylammonium nitrate, C5: tetraethylammonium chloride
D: polyethylene glycol

Fig. 2

|  | Titanium Precursor | Organic Solvent | Anion Source 1 | Anion Source 2 | Aqueous Solution | Phase Separation Inducer |
|---|---|---|---|---|---|---|
| Example 26 | A1/5mL | B1/3.6mL | C1/1.9mL | C3(2M)/0.16g | 1mL | None |
| Example 27 | A1/5mL | B1/3.8mL | C1/1.7mL | C3(4M)/0.24g | 1mL | None |
| Example 28 | A1/50mL | B1/35mL | C1/20mL | C3(1M)/0.8g | 10mL | None |
| Example 29 | A1/500mL | B1/350mL | C1/200mL | C3(1M)/8g | 100mL | None |
| Example 30 | A1/5mL | B1/3.5mL | C1/2mL | C3(2M)/0.16g | 1mL | None |
| Example 31 | A1/5mL | B1/3.7mL | C1/1.8mL | C3(4M)/0.24g | 1mL | None |
| Example 32 | A1/5mL | B1/3.5mL | C1/2mL | C3(4M)/0.24g | 1mL | None |
| Example 33 | A1/5mL | B1/3.5mL | C1/2mL | C5/0.6g | 1mL | None |
| Example 34 | A1/5mL | None | C1/5.5mL | C3(1M)/0.08g | 1mL | None |
| Example 35 | A1/5mL | None | C1/2.5mL | C2/3g | 1mL | None |
| Example 36 | A2/5mL | B1/3.8mL | C1/1.7mL | C3(4M)/0.24g | 1mL | None |
| Example 37 | A2/5mL | B1/2.5mL | C1/2.5mL | C3(1M)/0.08g | 1mL | D/0.35g |
| Example 38 | A3/5mL | B1/3.35mL | C1/2.15mL | C3(4M)/0.24g | 1mL | None |
| Example 39 | A3/5mL | None | C1/5.5mL | C3(1M)/0.08g | 1mL | D/0.24g |
| Comparative Example 13 | A1/5mL | B1/4mL | C1/1.5mL | C3(6M)/0.32g | 1mL | None |
| Comparative Example 14 | A1/5mL | B1/4.2mL | C1/1.3mL | C3(8M)/0.4g | 1mL | None |
| Comparative Example 15 | A1/5mL | B1/3.9mL | C1/1.6mL | C3(6M)/0.32g | 1mL | None |
| Comparative Example 16 | A1/5mL | B1/4.1mL | C1/1.4mL | C3(8M)/0.4g | 1mL | None |
| Comparative Example 17 | A1/5mL | B1/3.7mL | C1/1.8mL | C3(6M)/0.32g | 1mL | None |
| Comparative Example 18 | A1/5mL | B1/3.9mL | C1/1.6mL | C3(8M)/0.4g | 1mL | None |

A1: titanium isopropoxide, A2: titanium n-propoxide, A3: titanium ethoxide
B1: 1-propanol, B2: methanol
C1: ethyl acetoacetate, C2: acetic acid, C3: ammonium nitrate, C4: tetraethylammonium nitrate, C5: tetraethylammonium chlorid
D: polyethylene glycol

Fig. 3

| | Temperature Control | Temperature for promoting Gelation | Molar Ratio of Anion Source | | | Gelation Time | Special Notes |
|---|---|---|---|---|---|---|---|
| | | | 1A | 1B | Total | | |
| Example 1 | ≤ 70°C | 40°C | 1.05 | 0 | 1.05 | 0.25min | |
| Example 2 | ≤ 70°C | 40°C | 1.1 | 0 | 1.1 | 0.3min | |
| Example 3 | ≤ 70°C | 40°C | 1.25 | 0 | 1.25 | 0.5min | |
| Example 4 | ≤ 70°C | 40°C | 1.5 | 0 | 1.5 | 1min | |
| Example 5 | ≤ 70°C | 40°C | 1.75 | 0 | 1.75 | 1.5min | |
| Example 6 | ≤ 70°C | 40°C | 2 | 0 | 2 | 2.5min | |
| Example 7 | ≤ 70°C | 40°C | 2.25 | 0 | 2.25 | 3min | |
| Example 8 | ≤ 70°C | 40°C | 2.5 | 0 | 2.5 | 5min | |
| Example 9 | ≤ 70°C | 40°C | 1 | 0.05 | 1.05 | 3min | |
| Example 10 | 80-82°C | 40°C | 1 | 0.05 | 1.05 | 3min | |
| Example 11 | ≤ 70°C | 40°C | 1 | 0.3 | 1.3 | 1min | |
| Example 12 | ≤ 70°C | 40°C | 3 | 0 | 3 | > 180min | |
| Example 13 | ≤ 70°C | 40°C | 2.75 | 0 | 2.75 | 60min | |
| Example 14 | ≤ 70°C | 60°C | 2.75 | 0 | 2.75 | 10min | |
| Example 15 | ≤ 70°C | 40°C | 1 | 0.05 | 1.05 | 1min | |
| Example 16 | ≤ 70°C | 40°C | 1 | 0.05 | 1.05 | 1min | |
| Example 17 | ≤ 60°C | 40°C | 1 | 0.05 | 1.05 | 2min | |
| Example 18 | ≤ 70°C | 40°C | 1.05 | 0 | 1.05 | 0.4min | |
| Example 19 | ≤ 70°C | 40°C | 1.1 | 0 | 1.1 | 0.5min | |
| Example 20 | ≤ 70°C | 40°C | 1.25 | 0 | 1.25 | 1min | |
| Example 21 | ≤ 70°C | 40°C | 1.5 | 0 | 1.5 | 2min | |
| Example 22 | ≤ 70°C | 40°C | 1.05 | 0 | 1.05 | 0.5min | |
| Example 23 | ≤ 70°C | 40°C | 1.1 | 0 | 1.1 | 1min | |
| Example 24 | ≤ 70°C | 40°C | 1.25 | 0 | 1.25 | 1min | |
| Example 25 | ≤ 70°C | 40°C | 1.5 | 0 | 1.5 | 1.5min | |
| Comparative Example 1 | ≤ 70°C | 40°C | 0.5 | 0 | 0.5 | In a moment | Precipitates |
| Comparative Example 2 | ≤ 70°C | 40°C | 0.75 | 0 | 0.75 | In a moment | Precipitates |
| Comparative Example 3 | ≤ 70°C | 40°C | 1 | 0 | 1 | In a moment | Precipitates |
| Comparative Example 4 | 90-95°C | 40°C | 1.1 | 0 | 1.1 | In a moment | Precipitates |
| Comparative Example 5 | 90-95°C | 40°C | 1 | 0.05 | 1.05 | In a moment | Precipitates |
| Comparative Example 6 | ≤ 70°C | 40°C | 0 | 0 | 0 | In a moment | Precipitates |
| Comparative Example 7 | 90-95°C | 40°C | 2.75 | 0 | 2.75 | Gelation did not occur | Precipitates |
| Comparative Example 8 | > 80°C | 40°C | 1 | 0.05 | 1.05 | 0.5min | Precipitates |
| Comparative Example 9 | ≤ 70°C | 40°C | 1 | 0 | 1 | In a moment | Precipitates |
| Comparative Example 10 | 95-100°C | 40°C | 1.5 | 0 | 1.5 | 0.5-3min | Unstable gelation time |
| Comparative Example 11 | Maintained at 100°C for 1 h | 40°C | 1.5 | 0 | 1.5 | | Not miscible |
| Comparative Example 12 | ≤ 70°C | 40°C | 1 | 0 | 1 | 0.3min | Development of precipitates in a moment |

Fig. 4

|  | Temperature Control | Temperature for promoting Gelation | Molar Ratio of Anion Source | | | Gelation Time | Special Notes |
|---|---|---|---|---|---|---|---|
|  |  |  | 1 | 2 | Total |  |  |
| Example 26 | ≤ 70°C | 40°C | 0.95 | 0.1 | 1.05 | 2.5min |  |
| Example 27 | ≤ 70°C | 40°C | 0.85 | 0.2 | 1.05 | 1.5min |  |
| Example 28 | ≤ 70°C | 40°C | 1 | 0.05 | 1.05 | 1min |  |
| Example 29 | ≤ 70°C | 40°C | 1 | 0.05 | 1.05 | 1min |  |
| Example 30 | ≤ 70°C | 40°C | 1 | 0.1 | 1.1 | 4.5min |  |
| Example 31 | ≤ 70°C | 40°C | 0.9 | 0.2 | 1.1 | 3min |  |
| Example 32 | ≤ 70°C | 40°C | 1 | 0.2 | 1.2 | 10min |  |
| Example 33 | ≤ 70°C | 40°C | 1 | 0.3 | 1.3 | 5min |  |
| Example 34 | ≤ 70°C | 40°C | 3 | 0.05 | 3.05 | > 180min |  |
| Example 35 | ≤ 70°C | 40°C | 1.25 | 3 | 4.25 | 0.5min |  |
| Example 36 | ≤ 70°C | 40°C | 0.85 | 0.2 | 1.05 | 5min |  |
| Example 37 | ≤ 80°C | 40°C | 1.2 | 0.05 | 1.25 | 2min |  |
| Example 38 | ≤ 70°C | 40°C | 0.85 | 0.2 | 1.05 | 5min |  |
| Example 39 | ≤ 70°C | 40°C | 2.2 | 0.04 | 2.24 | 3min |  |
| Comparative Example 13 | ≤ 70°C | 40°C | 0.75 | 0.3 | 1.05 | 3min | Precipitation |
| Comparative Example 14 | ≤ 70°C | 40°C | 0.65 | 0.4 | 1.05 | 10min | Precipitation |
| Comparative Example 15 | ≤ 70°C | 40°C | 0.8 | 0.3 | 1.1 | 10min | Precipitation |
| Comparative Example 16 | ≤ 70°C | 40°C | 0.7 | 0.4 | 1.1 | 20min | Precipitation |
| Comparative Example 17 | ≤ 70°C | 40°C | 0.9 | 0.3 | 1.2 | 30min | Precipitation |
| Comparative Example 18 | ≤ 70°C | 40°C | 0.8 | 0.4 | 1.2 | 60min | Precipitation |

Fig. 5

| Group | Organic Solvent | Anion Source 1A | Anion Source 1B | Anion Source 2 | Phase Separation Inducer | Example | Comparative Example |
|---|---|---|---|---|---|---|---|
| 1 | ○ | ○ | × | × | × | 1-8, 12, 18-25 | 1-4, 9-12 |
| 2 | ○ | ○ | ○ | × | × | 9-11 | 5 |
| 3 | ○ | ○ | ○ | × | ○ | 15-17 | 8 |
| 4 | × | ○ | × | × | × | 13, 14 | 7 |
| 5 | ○ | ○ | × | ○ | × | 26-33, 36, 38 | 13-18 |
| 6 | ○ | ○ | × | ○ | ○ | 37 | |
| 7 | × | ○ | × | ○ | × | 34, 35 | |
| 8 | × | ○ | × | ○ | ○ | 39 | |
| 9 | × | × | × | × | × | | 6 |

○: yes  ×: no

Fig. 6

Example 15 (Group 3)

Example 16 (Group 3)

METHOD FOR PRODUCING MONOLITHIC POROUS BODY COMPRISING TITANIA

TECHNICAL FIELD

The present invention relates to a method for producing a monolithic porous body formed of titania having a three-dimensional continuous network structure by a sol-gel method.

BACKGROUND ART

As a monolith which is an inorganic porous body having a three-dimensional continuous network structure, there is a titania monolith formed of a titanium oxide (titania) manufactured by using a titanium compound such as a titanium alkoxide as a starting material. The titania monolith is manufactured by subjecting a titanium precursor, which is its starting material, to hydrolysis•polycondensation with water in parallel, and the titania monolithic gel is prepared through the sol-gel transition. However, methods for producing the titania monolith are limited because a titanium alkoxide [chemical formula: $Ti(OR)_4$, wherein R is an alkyl group] has extremely high reactivity with a water molecule as compared to a silica gel manufactured by using a silica alkoxide as a starting material.

As a specific method for producing a titania monolithic porous body, the following Patent Document 1 discloses a method for producing a titania monolith by subjecting a titanium alkoxide to a reaction in an acidic aqueous solution having a pH of equal to or lower than 3.5 (the first conventional production method). In the first conventional production method, a titanium alkoxide is stabilized as a titanium chloride under strong hydrochloric acid before being proceeded to a sol-gel reaction. However, in the production method which uses a strong acid, a reaction is vigorous, and a production condition is restrictive. In addition, there is a problem that the method is not suitable for treatment of materials which does not have acid resistance such as coating onto a metal.

As a solution thereto, a method for synthesizing a titania monolith by hydrolyzing a titanium alkoxide under a mild condition which uses an organic solvent (the second conventional production method) is proposed in the following Non-Patent Documents 1 and 2. In the second conventional production method, a titania monolithic gel is manufactured by making hydrolysis•polycondensation reactions progress mildly due to the reaction of a stabilized titanium precursor, which is a titanium alkoxide to which an anion coordinates, with a water molecule.

PRIOR ART DOCUMENTS

Patent Document

Patent Document 1: Japanese Patent No. 4,874,976

Non-Patent Documents

Non-Patent Document 1: George Hasegawa et al., "Facile Preparation of Hierarchically Porous TiO2 Monoliths", J. Am. Ceram. Soc., 93 [10] 3110-3115 (2010)

Non-Patent Document 2: George Hasegawa et al., "Facile preparation of transparent monolithic titania gels utilizing a chelating ligand and mineral salts" J Sol-Gel Sci Technol (2010) 53: 59-66

SUMMARY OF THE INVENTION

Problems to be Solved by the Invention

The reaction mechanisms in the above-described second conventional production method include the following two reaction mechanisms. In the first reaction mechanism, an anion coordinates to a titanium alkoxide in an organic solvent to make a complex, and a stabilized titanium precursor solution is prepared. More specifically, a titanium alkoxide is made to react with a β-diketone compound to give a titanium precursor solution. As a β-diketone compound, an enol-form is stabilized due to keto-enol tautomerism, and the enol-form releases a proton by the reaction with the titanium alkoxide to be an enolate anion, which acts as a coordinating anion.

In the second reaction mechanism, the titanium precursor solution obtained in the first reaction mechanism is made to react with a water molecule such that the water molecule is incorporated through the complex forming reaction of the titanium precursor with an anion, and then hydrolysis and polycondensation progress in parallel to form a network of Ti—O—Ti bonds, while the sol-gel transition occurs to form a titania gel.

In other words, in the second conventional production method, hydrolysis and polycondensation reactions due to the reaction of the titanium precursor with water are suppressed by the coordination of the anion to the titanium alkoxide, and then stable hydrolysis•polycondensation reactions are achieved.

However, the second conventional production method has problems described below. First, in the reaction where an anion is made to coordinate to a titanium alkoxide in an organic solvent to stabilize the titanium alkoxide, and then hydrolysis and polycondensation are made to occur in parallel to gelate by adding water, a by-product produced in the reaction of the titanium alkoxide with the anion is an alcohol having a relatively low boiling point such as methanol, ethanol and propanol. Further, the reaction of the titanium alkoxide with the anion is an exothermic reaction, and therefore, the organic solvent containing the alcohol which is the by-product in the reaction system is evaporated and removed by the heat of reaction. Then, the composition of the reaction system is significantly changed. In other words, a variation in the amount of the organic solvent contained in the sol of the titanium precursor prepared by the coordination of the anion to the titanium alkoxide occurs, and therefore, it becomes difficult to manufacture a homogeneous titania monolithic porous body with good reproducibility.

Second, with regard to the second conventional production method, an aqueous solution containing an anion is used for supplying a water molecule in the above-described second reaction mechanism, and therefore, the stabilization of the titanium precursor by the coordination of the anion in the aqueous solution to the titanium alkoxide and hydrolysis and polycondensation reactions due to the reaction of the titanium precursor with water progress in parallel. Accordingly, under some reaction conditions, hydrolysis and polycondensation reactions may not be sufficiently suppressed and may progress abruptly, and then, insoluble matters which cannot be polymerized may occur as precipitates. In such a case, there is a possibility that a heterogeneous titania gel is obtained or that a monolithic porous body is not formed.

In fact, in the above-described Patent Document 1 and Non-Patent Documents 1 and 2, practicality only of titanium n-propoxide which has a relatively low reactivity as a titanium alkoxide is confirmed in Examples. No practicality of other titanium alkoxides having a shorter molecular chain and a higher reactivity than titanium n-propoxide, such as titanium isopropoxide and titanium ethoxide, is tested at all. Accordingly, conventionally, the titanium alkoxide other than titanium n-propoxide has not been used as a titanium precursor for producing a titania monolithic porous body due to the high reactivity.

Furthermore, in the above-described Non-Patent Documents 1 and 2, the above-described first problem is not recognized, and naturally, no solution thereto is mentioned at all. In addition, in the above-described Non-Patent Documents 1 and 2, there is no study at all about an extent of a required amount of an anion depending on a titanium alkoxide to be used in the step of stabilizing the titanium alkoxide by the coordination of the anion thereto. In the above-described Non-Patent Document 2, only the relationship between a molar ratio of titanium n-propoxide to ethyl acetoacetate, which is an anion source, and a gelation time is shown.

Accordingly, it is a fact that a method for stably manufacturing a homogeneous monolithic porous body formed of titania by using a titanium alkoxide other than titanium n-propoxide such as titanium isopropoxide and titanium ethoxide has not been still established.

The present invention is made in view of the problems of the above-described conventional methods for producing the titania monolithic porous body, and an object of the present invention is to provide a method for producing a titania monolithic porous body which makes it possible to manufacture a homogeneous titania monolithic porous body stably by a sol-gel method by using a titanium precursor comprising a titanium alkoxide having a shorter molecular chain than titanium n-propoxide.

Means for Solving the Problem

The present inventors of the present application have found out by the earnest research that, with regard to three kinds of titanium alkoxides having different molecular chains (in a descending order of a molecular chain length, titanium n-propoxide, titanium isopropoxide and titanium ethoxide), it is sufficient that a molar ratio of a compound which becomes an anion source required for stabilizing a respective titanium alkoxide to the titanium alkoxide is commonly and generally equal to or higher than 1.05. In addition, the present inventors have found out that even in the case when a molar ratio of an anion source to a titanium alkoxide is equal to or higher than 1.05, it is required to control a temperature of the reaction system from the reaction of the titanium alkoxide with the anion source to the gelation. Then, the present inventors have confirmed that the change in the composition of the reaction system is sufficiently suppressed by controlling the temperature of the reaction system to be lower than the boiling point of the compound having the lowest boiling point in the titanium precursor solution containing a by-product produced by the reaction of the titanium alkoxide with the anion source, and then a homogeneous titania gel can be obtained with good reproducibility.

In other words, in order to achieve the above-described object, the present invention provides a method for producing a monolithic porous body formed of titania having a three-dimensional continuous network structure by using a sol-gel method, the method comprising:

a first step for preparing a titanium precursor solution by mixing a titanium precursor and a first anion source in an organic solvent;

a second step for preparing a sol by adding water or an aqueous solution containing a second anion source to the titanium precursor solution to initiate a hydrolysis reaction and a polycondensation reaction;

a third step for forming a co-continuous structure of a titania hydrogel phase and a solvent phase by maintaining the sol at a predetermined temperature for promoting gelation such that sol-gel transition and phase separation occur in parallel by progress of the hydrolysis reaction and the polycondensation reaction; and a fourth step for removing the solvent phase from the co-continuous structure;

wherein the titanium precursor is a titanium alkoxide other than titanium methoxide, wherein the first and the second anion sources are compounds that release protons in the reaction with the titanium precursor and act as anions that coordinate-bond to the titanium precursor, wherein a temperature of the titanium precursor solution and the sol is maintained at a temperature lower than the boiling point of the compound having the lowest boiling point present in the titanium precursor solution in the first, second and third steps, wherein when water is added to the titanium precursor solution in the second step, a blending amount of the first anion source is set such that a molar ratio of the first anion source to the titanium precursor is equal to or higher than 1.05, and wherein when the aqueous solution containing the second anion source is added to the titanium precursor solution in the second step, a blending amount of the first anion source and the second anion source is set such that a molar ratio of the first anion source and the second anion source in total to the titanium precursor is equal to or higher than 1.05, provided that when the second anion source is hardly soluble to the organic solvent, the blending amount is set such that a molar ratio of the second anion source to the titanium precursor does not exceed 0.3.

Meanwhile, when water is added to the titanium precursor solution in the second step, the compound having the lowest boiling point present in the titanium precursor solution corresponds to the compound having the lowest boiling point in the titanium precursor solution containing a by-product produced in the reaction of the above-described titanium alkoxide with the first anion source, and is the compound having the lowest boiling point among the organic solvent, the titanium alkoxide, the first anion source and the by-product. When the aqueous solution containing the second anion source is added to the titanium precursor solution in the second step, the compound having the lowest boiling point present in the titanium precursor solution corresponds to the compound having the lowest boiling point in the titanium precursor solution containing a by-product produced in the reaction of the above-described titanium alkoxide with the first and the second anion sources, and is the compound having the lowest boiling point among the organic solvent, the titanium alkoxide, the first and the second anion sources, and the by-product.

In the method for producing the monolithic porous body according to the above-described feature, basically, by setting the blending amount of the first anion source such that the molar ratio of the first anion source to the titanium precursor is equal to or higher than 1.05, the stabilization of the titanium precursor solution is attained, and rapid progress of the hydrolysis reaction and the polycondensation reaction which start by adding water or the aqueous solution to the titanium precursor solution is suppressed. However, when the sol is prepared by adding the aqueous solution containing the second anion source to the titanium precursor solution in the second step, though the blending amount of the first anion source is reduced to lower than 1.05, the deficiency can be compensated by the second anion source by setting the molar ratio of the total of the first anion source and the second anion source to the titanium precursor to be equal to or higher than 1.05, and then the above-described suppressing effect can be maintained. However, when the second anion source is hardly soluble to the organic solvent, it is preferable to limit the blending amount of the second anion source such that the molar ratio of the second anion source to the titanium precursor does not exceed 0.3.

In addition, in the method for producing the monolithic porous body according to the above-described feature, it is preferable that the titanium precursor comprise at least one of titanium n-propoxide, titanium isopropoxide and titanium ethoxide.

Further, in the method for producing the monolithic porous body according to the above-described feature, it is preferable that the titanium precursor comprise at least one of titanium isopropoxide and titanium ethoxide.

Furthermore, in the method for producing the monolithic porous body according to the above-described feature, it is preferable that when the aqueous solution containing the second anion source is added to the titanium precursor solution in the second step, a blending amount of the first anion source and the second anion source is set such that a molar ratio of the first anion source and the second anion source in total to the titanium precursor is equal to or higher than 1.05, provided that when the second anion source is hardly soluble to the organic solvent, the blending amount is set such that a molar ratio of the second anion source to the titanium precursor is equal to or lower than 0.2.

In addition, in the method for producing the monolithic porous body according to the above-described feature, it is preferable that when the aqueous solution containing the second anion source is added to the titanium precursor solution in the second step, a blending amount of the first anion source and the second anion source is set such that a molar ratio of the first anion source and the second anion source in total to the titanium precursor is equal to or higher than 1.05, and that a molar ratio of the first anion source to the titanium precursor is equal to or higher than 0.85.

Further, in the method for producing the monolithic porous body according to the above-described feature, the first anion source may be used as the organic solvent in the first step. In other words, the first anion source and the organic solvent may be the same.

Furthermore, in the method for producing the monolithic porous body according to the above-described feature, it is preferable that the titanium precursor solution be prepared by adding the titanium precursor to a mixed solvent of the organic solvent and the first anion source in the first step.

In addition, in the method for producing the monolithic porous body according to the above-described feature, it is preferable that a co-existing substance that has an action of evoking sol-gel transition and spinodal decomposition type phase separation in parallel be added to the organic solvent in the first step.

Further, in the method for producing the monolithic porous body according to the above-described feature, it is preferable that the first anion source be a first type coordination compound that is soluble to the organic solvent and is hardly soluble to water or a second type coordination compound that is soluble to both of the organic solvent and water, and the second anion source be the second type coordination compound or a third type coordination compound that is hardly soluble to the organic solvent and is soluble to water.

Furthermore, in the method for producing the monolithic porous body according to the above-described feature, it is preferable that the first anion source comprise a β-diketone compound, a carboxylic acid or an isomer or a complex thereof.

Effect of the Invention

According to the method for producing the monolithic porous body according to the above-described feature, first, it is possible to suppress the change in the composition in the titanium precursor solution and the sol due to evaporation of the compound and to prepare a homogeneous sol, by maintaining a temperature of the titanium precursor solution and the sol at a temperature lower than the boiling point of the compound having the lowest boiling point present in the titanium precursor solution in the first step, in the first, second and the third steps. As a result, a homogeneous gel can be obtained with good reproducibility. In addition, a molar ratio of the first anion source to the titanium precursor is set to be equal to or higher than 1.05 or a molar ratio of the first anion source and the second anion source in total to the titanium precursor is set to be equal to or higher than 1.05, provided that when the second anion source is hardly soluble to the organic solvent, a molar ratio of the second anion source to the titanium precursor is set to be below 0.3. By setting in such a way, the titanium precursor solution is sufficiently stabilized, and the abrupt progress of the hydrolysis reaction and the polycondensation reaction after mixing water or the aqueous solution containing the second anion source with the titanium precursor solution in the second step is suppressed. As a result, generation of a heterogeneous gel due to development of insoluble matters as precipitates which cannot be polycondensed is suppressed. By conducting the above-described two controls, that is, the temperature control and the control of the blending amount of the anion source(s), it becomes possible to manufacture a homogeneous titania monolithic porous body by a sol-gel method by using a titanium alkoxide having a shorter molecular chain than titanium n-propoxide and having a high reactivity, which has not been conventionally used as a titanium precursor. Meanwhile, titanium n-propoxide and a titanium alkoxide having a longer molecular chain than titanium n-propoxide (for example, titanium n-butoxide, titanium s-butoxide, titanium t-butoxide, and the like) have low reactivity and are more stable, and therefore, in the same manner as titanium isopropoxide and the like, can be used as a titanium precursor in the method for producing the monolithic porous body according to the above-described feature.

BRIEF DESCRIPTION OF THE DRAWINGS

FIG. 2 is a table which shows the production conditions which relate to used raw materials of Examples 1 to 25 and Comparative Examples 1 to 12.

FIG. 3 is a table which shows the production conditions which relate to used raw materials of Examples 26 to 39 and Comparative Examples 13 to 18.

FIG. 4 is a table which shows each of various kinds of control conditions and results of the production with regard to Examples 1 to 25 and Comparative Examples 1 to 12.

FIG. 5 is a table which shows each of various kinds of control conditions and results of the production with regard to Examples 26 to 39 and Comparative Examples 13 to 18.

FIG. 6 is a table which shows the classification of Examples 1 to 39 and Comparative Examples 1 to 18 into 9 groups based on the presence or absence of each of used raw materials.

DESCRIPTION OF EMBODIMENT

Figure 1:
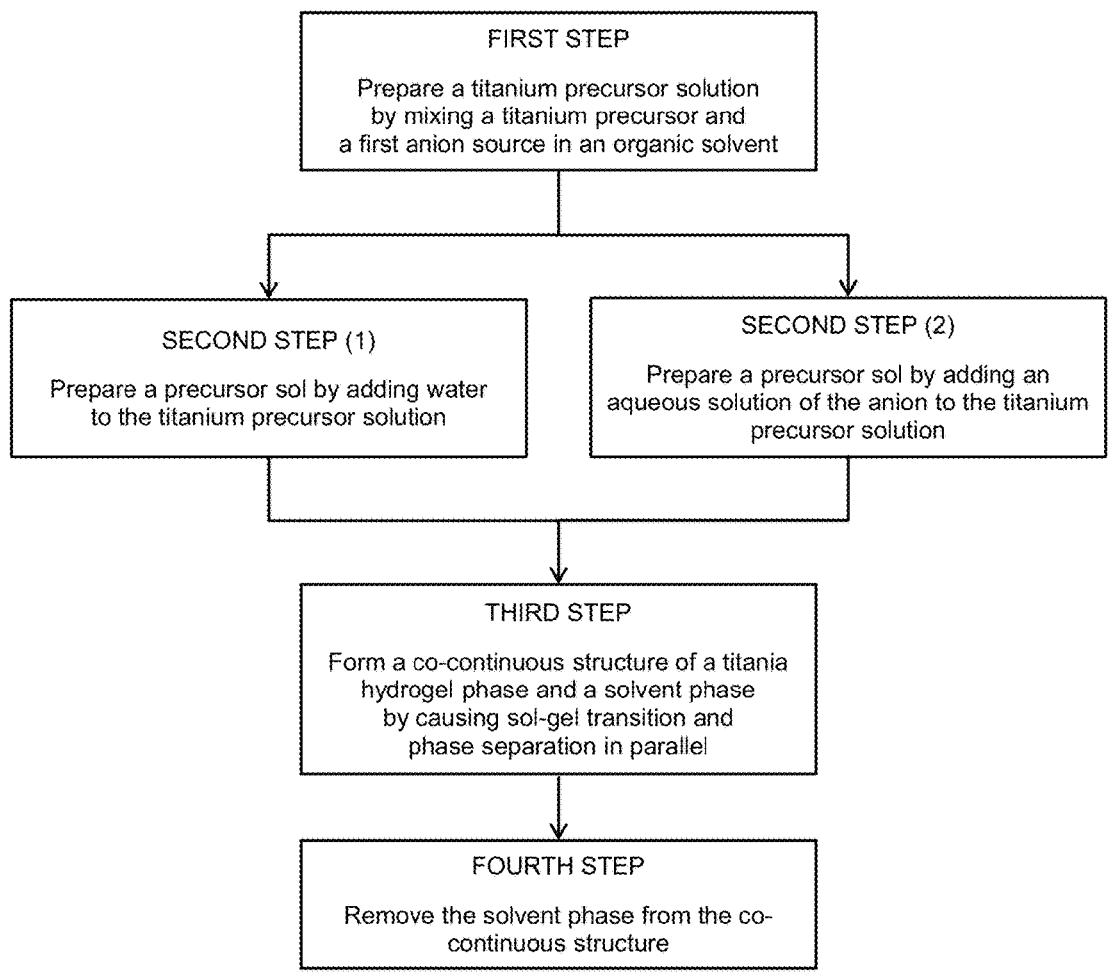
FIG. 1 is a flow process chart which shows the constitution of a typical outline of the method for producing the titania monolithic porous body according to the present invention.

An embodiment of the method for producing the monolithic porous body formed of titania having the three-dimensional continuous network structure by using the sol-gel method according to the present invention (hereinafter, appropriately referred to as "the present producing method") is described by referring to the drawings.

The present producing method is composed by having the first, second, third and fourth steps described hereinbelow as shown in FIG. 1. In the first step, a titanium precursor solution is prepared by mixing a titanium precursor and a first anion source in an organic solvent by stirring and the like. In the second step, water or an aqueous solution containing a second anion source (hereinafter, referred to as "the aqueous solution of the anion" for the sake of convenience) is added to the titanium precursor solution prepared in the first step, such that a hydrolysis reaction and a polycondensation reaction are initiated to prepare a precursor sol. In the third step, a temperature of the precursor sol prepared in the second step is maintained at a predetermined temperature for promoting gelation such that sol-gel transition and phase separation occur in parallel by making the hydrolysis reaction and the polycondensation reaction which are initiated in the second step progress to form a co-continuous structure of a titania hydrogel (a wet gel) phase and a solvent phase. In the fourth step, the solvent phase is removed from the co-continuous structure formed in the third step. Meanwhile, FIG. 1 shows a typical example of the constitution of the present producing method, and illustrates such that the third step starts after the second step completes. However, it is not required that the third step starts after the preparation of the precursor sol is completely finished. The third step may start from the middle of the second step, or the third step may start at the same time as the start of the second step such that the third step and the preparation of the precursor sol start in parallel. In addition, the temperature for promoting gelation maintained in the third step may be predetermined in the second step, and thereafter, the temperature for promoting gelation may be maintained throughout the third step.

FIG. 1 illustrates the second step of the case of preparing the precursor sol by adding water to the titanium precursor solution prepared in the first step (the second step (1)) and that of the case of preparing the precursor sol by adding the aqueous solution of the anion to the titanium precursor solution prepared in the first step (the second step (2)). In any case, after the first step, any one of the second step (1) or (2) is conducted, and thereafter, the third step is conducted. The second step (1) corresponds to the case of the second step (2) in which a molar concentration of the second anion source in the aqueous solution of the anion is equal to 0.

In the present embodiment, a titanium alkoxide other than titanium methoxide is used as a titanium precursor. It is preferable to use at least one of titanium n-propoxide, titanium isopropoxide and titanium ethoxide, it is more preferable to use at least one of titanium isopropoxide and titanium ethoxide, and it is further more preferable to use titanium isopropoxide.

The first and the second anion sources are compounds which release protons in the reaction with a titanium alkoxide and act as anions that coordinate-bond to the titanium alkoxide. Accordingly, in the first step, the first anion source coordinate-bonds to the titanium alkoxide, and as a by-product, an alcohol corresponding to an alkoxide group of the titanium alkoxide is generated. In addition, in the second step, when the precursor sol is prepared by using the aqueous solution of the anion, the second anion source coordinate-bonds to the titanium alkoxide in the titanium precursor solution, and as a by-product, an alcohol corresponding to an alkoxide group of the titanium alkoxide is generated. When the titanium precursor is titanium n-propoxide, 1-propanol having a boiling point of about 97 to 98° C. is generated, when the titanium precursor is titanium isopropoxide, 2-propanol having a boiling point of 82.4° C. is generated, and when the titanium precursor is titanium ethoxide, ethanol having a boiling point of 78.37° C. is generated, respectively.

Since abrupt heat generation may occur by the reaction of the titanium alkoxide with the first and the second anion sources, when the heat generation is left as it is, an alcohol which is the by-product is evaporated, and the composition in the titanium precursor solution or in the precursor sol is changed. However, the change is not necessarily uniform, and therefore, the change affects the preparation of the precursor sol, the sol-gel transition and the like, which makes it difficult to manufacture a homogeneous gel with good reproducibility. Then, in the present embodiment, throughout the first, second and third steps, the temperature control is performed such that a temperature of the titanium precursor solution and the precursor sol does not become equal to or higher than the boiling point of the compound having the lowest boiling point present in the titanium precursor solution (hereinafter, the temperature control is referred to as "the present temperature control" for the sake of convenience). Specifically, in the case where the use of an organic solvent having a boiling point equal to or higher than a boiling point of an alcohol which is the by-product is assumed, a temperature of the titanium precursor solution and the precursor sol is controlled as follows. When the titanium precursor is titanium n-propoxide, the temperature is controlled to be lower than 97° C., when the titanium precursor is titanium isopropoxide, the temperature is controlled to be lower than 82.4° C., and when the titanium precursor is titanium ethoxide, the temperature is controlled to be lower than 78.37° C. Meanwhile, examples of the cooling method for the present temperature control include an external cooling method such as a method which comprises causing convection of a cooled gas outside of a reaction container accommodating the organic solvent, the titanium precursor and the first anion source in the first step, a method for cooling by using a water bath, an ice bath or the like from outside of the reaction container and the like. In addition, other examples of the cooling method in the first step include an internal cooling method which uses the titanium precursor which has been cooled to be a solid state, and utilizes heat of dissolution of the titanium precursor generated by making the reaction of the solid state titanium precursor and the liquid first anion source occur at the solid-liquid interface. In addition, as the present temperature control in the first step, a mixing rate of the titanium precursor and the first anion source may be adjusted without using cooling or may be adjusted in combination with the above-described cooling method such that the increase in the temperature during the reaction does not cause a temperature which exceeds a predetermined temperature. Further, as the present temperature control in the second step, an external cooling method may be used in the same manner as the first step. Meanwhile, when water is added to the titanium precursor solution in the second step, the reaction of the titanium precursor with the second anion source does not cause heat generation, and therefore, the present temperature control in the same manner as the first step is not necessarily required.

When water is added to the titanium precursor solution in the second step (the second step (1)), in other words, when the second anion source is not added to the titanium precursor solution, a blending amount of the first anion source which is subjected to the reaction with the titanium precursor in the first step is set such that a molar ratio of the first anion source to the titanium precursor is equal to or higher than 1.05. Alternatively, when the aqueous solution of the anion is added to the titanium precursor solution in the second step (the second step (2)), each of blending amounts of the first and the second anion sources which are subjected to the reaction with the titanium precursor in the first and the second steps is set such that a molar ratio of the total of the first and the second anion sources to the titanium precursor is equal to or higher than 1.05. However, when the second anion source is hardly soluble to the organic solvent, each of blending amounts is set such that a molar ratio of the second anion source to the titanium precursor does not exceed 0.3, and more preferably, such that a molar ratio of the second anion source to the titanium precursor is equal to or lower than 0.2. By adjusting the blending amount of the first anion source or each of the blending amounts of the first and the second anion sources in the above-described manner, the anion source(s) properly coordinates to the titanium precursor and stabilizes the titanium precursor. Accordingly, the abrupt progress of the hydrolysis reaction and the polycondensation reaction immediately after adding water or the aqueous solution of the anion is suppressed, and therefore, a homogeneous precursor sol can be obtained without development of insoluble matters which cannot be polycondensed. As a result, the development of insoluble matters as precipitates in the third step is suppressed, and a homogeneous titania monolithic gel is generated. Hereinafter, the above-described setting of the blending amount of the first anion source or each of the blending amounts of the first and the second anion sources is referred to as "the molar ratio control" for the sake of convenience.

As a method for mixing raw materials in the first step (the organic solvent, the titanium precursor and the first anion source) and a method for mixing raw materials in the second step (the titanium precursor solution, water or the aqueous solution of the anion), a method which comprises feeding these liquid raw materials into a reaction container and stirring mechanically by means of a magnet stirrer and a stirring blade, or a method by means of shaking or the like may be employed. In addition, as a method for adding raw materials, a method for adding raw materials manually or a method for adding raw materials at a homogeneous rate by an automated mechanical means such as a pump may be used.

As a procedure for mixing the titanium precursor and the first anion source in the organic solvent in the first step, there is a method which comprises adding the titanium precursor to a mixed solvent of the organic solvent and the first anion source under stirring to prepare a homogeneous titanium precursor solution. In the procedure, a homogeneous titanium precursor solution may be obtained by a method which comprises adding the titanium precursor, and thereafter, adding the first anion source which may be the same as or different from the first anion source mixed before, and stirring for a predetermined period of time. In addition, a homogeneous titanium precursor solution may be obtained by a method which comprises manufacturing a solution obtained by dissolving the titanium precursor into the organic solvent, and thereafter, adding the first anion source under stirring. Further, the titanium precursor solution may be prepared by using the first anion source as the organic solvent in the first step and directly mixing the titanium precursor and the first anion source.

With regard to a rate of addition of water or the aqueous solution of the anion to the titanium precursor solution in the second step, when addition is performed instantaneously, there is a possibility that insoluble matters which cannot be polycondensed develop, and therefore, it is preferable to adjust the rate of addition to a degree of a range in which the insoluble matters are not developed. Meanwhile, regardless of the rate of addition, the third step may be started in the middle of the second step or at the same time as the start of the second step such that addition of water or the aqueous solution of the anion is completed before the end of the third step.

In the third step, a temperature of the precursor sol is maintained at a predetermined temperature for promoting gelation to progress the hydrolysis reaction and the polycondensation reaction which are started in the second step, and to cause the sol-gel transition and the phase separation in parallel. In the first and the second steps, the increase in the temperature due to the reaction of the titanium precursor with the first anion source or the first and the second anion sources is suppressed by the above-described present temperature control, and when the reaction is completed or progressed to some degrees, the temperature of the precursor sol in the second step normally becomes lower than the lower limit of the temperature for promoting gelation by the present temperature control. Accordingly, in the third step, the precursor sol is heated to the predetermined temperature for promoting gelation such that the sol-gel transition and the phase separation occur in parallel. In addition, when the gelation rate in the third step is rapid, the temperature for promoting gelation may be maintained as it is in the third step by setting the temperature in the second step to the temperature for promoting gelation beforehand.

The temperature for promoting gelation is set to be a temperature higher than a solidification temperature of the precursor sol and lower than the boiling point of the compound having the lowest boiling point present in the above-described titanium precursor solution. In other words, the above-described present temperature control is substantially performed by setting the temperature for promoting gelation. The temperature for promoting gelation is a determinant factor of a time period required for the formation of the above-described co-continuous structure by promoting the sol-gel transition. Accordingly, the temperature for promoting gelation may be set arbitrarily in the above-described temperature range such that the controlling of the time period required for the formation of the co-continuous structure is in a practically operable range. In the present embodiment, the temperature for promoting gelation is set to be in a range, for example, from 40° C. to 60° C.

It is preferable that the first anion source used in the first step is a first type coordination compound which is soluble to the organic solvent and hardly soluble to water or a second type coordination compound which is soluble to both of the organic solvent and water. It is preferable that the second anion source used in the second step (2) is the above-described second type coordination compound or a third type coordination compound which is hardly soluble to the organic solvent and soluble to water.

Examples of the first and the second type coordination compounds include a β-diketone compound which exhibits keto-enol equilibrium, a carboxylic acid, and an isomer and a complex thereof. Specific examples of the first type coordination compound which may be used include acetylacetone, methyl acetoacetate, ethyl acetoacetate, propyl acetoacetate, butyl acetoacetate, a malonic ester, and the like. In addition, specific examples of the second type coordination compound which may be used include formic acid, acetic acid, propionic acid, citric acid, benzoic acid and malonic acid as well as a fluoride, a chloride, a bromide, a iodide, a nitrate, a sulfate, a carbonate, a phosphate, an acetate and a perchlorate of an alkylammonium.

Examples of the third type coordination compound which may be used include an inorganic salt such as a fluoride, a chloride, a bromide, a iodide, a nitrate, a sulfate, a carbonate, a phosphate, an acetate, and a perchlorate of an alkaline metal, an alkaline earth metal, a typical metal, a transition metal, a rare earth element, and ammonium and the like. More specific examples of the third type coordination compound which may be used include sodium fluoride, sodium chloride, potassium chloride, potassium bromide, potassium iodide, potassium nitrate, potassium sulfate, potassium acetate, potassium carbonate, calcium chloride, aluminum chloride, aluminium phosphate, iron chloride, yttrium chloride, lanthanum chloride, cerium chloride, ammonium fluoride, ammonium chloride, ammonium nitrate, ammonium carbonate, ammonium acetate, ammonium vanadate, ammonium hydrogen phosphate and the like.

Examples of the organic solvent which may be used in the first step include an alcohol such as methanol, ethanol, propanol, butanol and phenol, a ketone such as acetone, methyl ethyl ketone and diethyl ketone, an ether such as dimethyl ether, diethyl ether and dioxane, an ester such as methyl acetate and ethyl acetate as well as a hydrocarbon organic solvent such as pentane, hexane, cyclohexane, benzene and toluene. In addition, a derivative such as a halide, a thiol, a sulfide, an epoxide, a nitrile, an amine and an amide as well as an isomer thereof may also be used. Further, the organic solvent may be a solvent which contains a substituent of the above-described first or second anion source.

In the first step, when the solubility of the first anion source in the organic solvent is low, before mixing the titanium precursor, the first anion source is made to be sufficiently dissolved in the organic solvent by a method such as a method which comprises stirring the first anion source and the organic solvent for a longer period of time, a method which comprises heating the first anion source and the organic solvent and a method which comprises applying an ultrasonic wave to the first anion source and the organic solvent.

In addition, a co-existing substance that has an action of evoking the sol-gel transition and spinodal decomposition type phase separation in parallel (a phase separation inducer) may be mixed beforehand in the precursor sol which is gelated in the third step. The spinodal decomposition type phase separation is evoked in the middle of progress of the sol-gel transition and the phase separation in parallel due to the presence of the phase separation inducer, and therefore, a monolithic porous body having a co-continuous structure having two-scale hierarchical porous structures formed of through holes and pores can be obtained. In this case, a co-continuous structure of a three-dimensional continuous network structure having through holes and a skeletal body can be obtained, and the diameter of the through hole and the diameter of the skeletal body can be controlled by adjusting the amount of the phase separation inducer.

It is preferable to perform the addition of the phase separation inducer in the first or the second step before the sol-gel transition starts, and it is more preferable to perform the addition of the phase separation inducer especially in the first step before water or the aqueous solution of the anion is added to the titanium precursor solution to start the hydrolysis reaction and the polycondensation reaction. The order of adding the titanium precursor, the first anion source and the phase separation inducer to the organic solvent in the first step is not particularly limited, but as an example, the phase separation inducer may be added at the same time as or before or after adding the first anion source when the mixed solvent of the organic solvent and the first anion source is prepared. When the phase separation inducer is added in the second step, a method in which the phase separation inducer or an aqueous solution in which the phase separation inducer and the second anion source are dissolved is added to the titanium precursor solution may be considered.

The phase separation inducer may be a substance which can be homogeneously dissolved in the titanium precursor solution, and specific examples which can be suitably used as the phase separation inducer include a sodium salt or a potassium salt of a polystyrene sulfonate which is a metal salt of a macromolecular substance, a polyacrylic acid which is a polyacid and becomes a polyanion by being dissociated, a polyallylamine and a polyethyleneimine each of which is a macromolecular base which gives a polycation in an aqueous solution, a polyethylene oxide which is a neutral polymer and has an ether linkage in its main chain, a polyvinyl pyrrolidone having a pyrrolidone ring in its side chain and the like. In addition, a compound which has a surface activity such as a diblock or triblock copolymer composed of each of block chains of a polyethylene glycol and a polypropylene glycol each of which contains a polyether (Pluronic F127, P123, F68, L122, L121 and others, all of which are products of BASF Aktiengesellschaft, German Company) can be also suitably used as the phase separation inducer. Further, a cationic surfactant such as an alkylammonium halide, an anionic surfactant such as sodium dodecyl sulfate and an amphoteric surfactant such as lauryldimethylaminoacetic acid (LDA) can be used as the phase separation inducer. In addition, among the above, the cationic surfactant may be used as the first or second anion source.

In the fourth step, a wet gel is washed by immersing the co-continuous structure formed in the third step in water and/or an organic solvent such that the solvent phase is removed from the co-continuous structure and compounds remaining in the wet gel are removed. In addition, in the wet gel immediately after the gelation, the hydrolysis•polycondensation reactions are not completely finished. The hydrolysis•polycondensation reactions in the wet gel can progress by immersing the wet gel in water or a solvent in which water and a hydrophilic organic solvent are mixed. It becomes possible that the solubility of compounds remaining in the wet gel by being incorporated in the wet gel increases, and it becomes also possible that the rates of the hydrolysis and polycondensation reactions increase, by warming the wet gel when the wet gel is immersed in the solvent. Examples of the solvent include an organic solvent which is miscible with the above-described titanium precursor solution. In addition, remaining matters in the wet gel can be also removed by using a solution having a different pH from an isoelectric point of the gel such as an acid or an alkali as a washing solution. Specifically, each of various kinds of acids representative examples of which include hydrochloric acid, sulfuric acid, nitric acid, hydrofluoric acid, acetic acid, formic acid, carbonic acid, citric acid and phosphoric acid as well as each of various kinds of bases representative examples of which include sodium hydroxide, potassium hydroxide, ammonia, a water-soluble amine, sodium carbonate and sodium bicarbonate can be used.

According to the present embodiment, the wet gel is dried in the fourth step subsequent to washing of the wet gel. As a method for drying the wet gel, natural drying, reduced pressure drying under vacuum, drying under warming by using an electric oven and the like, drying performed after exchanging the solvent in the wet gel with a solvent with a low surface tension which has a lower surface tension than the solvent in the wet gel and freezing and sublimation drying may be employed. In addition, it is preferable to employ supercritical drying which is performed under a state of no surface tension after exchanging the solvent in the wet gel with carbon dioxide in a super critical state, and the like. It is possible to make the obtained dried gel to be a porous titania monolithic sintered body by sintering the dried gel by calcination.

Next, results of experiments for verifying effects of performing the above-described present temperature control and the molar ratio control in the present producing method are described. First, the titania monolithic porous bodies of Examples 1 to 39 and Comparative Examples 1 to 18 manufactured for the verifying experiments are described by referring to FIGS. 2 to 6. Meanwhile, in the description below, in the present producing method, the case where water is added to a titanium precursor solution in the second step is referred to as "the present producing method 1", and the case where an aqueous solution of an anion is added to a titanium precursor solution in the second step is referred to as "the present producing method 2", for the sake of convenience.

FIG. 2 collectively shows, with regard to Examples 1 to 25 and Comparative Examples 1 to 12 which were manufactured by the present producing method 1, the names of the substances and their volumes (the unit: mL) or weights (the unit: g) of a titanium precursor, an organic solvent and a first anion source which were used in the first step, the volume (the unit: mL) of water which was added in the second step, and the addition amount (the unit: g) of a phase separation inducer when being used. However, though Comparative Example 6 is classified into the group manufactured by the present producing method 1, the first step was omitted. Meanwhile, since this group includes Examples 9 to 11 and 15 to 17 as well as Comparative Examples 5 and 8 in which two kinds of the first anion sources were used, FIGS. 2 and 4 show the two kinds of the first anion sources as an anion source 1A and an anion source 1B, respectively. FIG. 3 collectively shows, with regard to Examples 26 to 39 and Comparative Examples 13 to 18 which were manufactured by the present producing method 2, a titanium precursor, an organic solvent, a first anion source and their volumes (the unit: mL) used in the first step, the volume (the unit: mL) of an aqueous solution of an anion added in the second step and the kind and the volume molar concentration (the unit: M) and weight (the unit: g) of a second anion source, and the addition amount (the unit: g) of a phase separation inducer when being added. FIGS. 3 and 5 show the first and the second anion sources as an anion source 1 and an anion source 2, respectively. Meanwhile, in FIGS. 2 and 3, the kinds of the titanium precursors are indicated by marks A1 to A3, the kinds of the organic solvents are indicated by marks B1 and B2, and the kinds of the first and the second anion sources are indicated by marks C1 to C5. A1, A2 and A3 represent titanium isopropoxide, titanium n-propoxide and titanium ethoxide, respectively. B1 and B2 represent 1-propanol and methanol, respectively. C1, C2, C3, C4 and C5 represent ethyl acetoacetate, acetic acid, ammonium nitrate, tetraethylammonium nitrate and tetraethylammonium chloride, respectively.

FIG. 4 collectively shows, with regard to Examples 1 to 25 and Comparative Examples 1 to 12 manufactured by the present producing method 1, the condition of the present temperature control, the temperature for promoting gelation, each molar ratio and the total molar ratio of the first anion source(s) (the anion source(s) 1A and/or 1B) to the titanium precursor, the gelation time, and special notes in the case where the gelation did not occur normally (Comparative Examples). FIG. 5 collectively shows, with regard to Examples 26 to 39 and Comparative Examples 13 to 18 manufactured by the present producing method 2, the condition of the present temperature control, the temperature for promoting gelation, each molar ratio and the total molar ratio of the first and the second anion sources (the anion sources 1 and 2) to the titanium precursor, the gelation time, and special notes in the case where the gelation did not occur normally (Comparative Examples). Meanwhile, the gelation time was measured as a time period from a time when water or the aqueous solution of the anion was added to a precursor sol to a time when fluidity of the precursor sol was lost.

As shown in FIGS. 2 and 3, with regard to the titanium precursor, titanium isopropoxide (A1) was used in Examples 1 to 17 and 26 to 35 as well as Comparative Examples 1 to 8 and 13 to 18, titanium n-propoxide (A2) was used in Examples 18 to 21, 36 and 37 as well as Comparative Examples 9 to 11, and titanium ethoxide (A3) was used in Examples 22 to 25, 38 and 39 as well as Comparative Example 12.

As shown in FIGS. 2 and 3, with regard to the organic solvent, 1-propanol (B1) was used in Examples 1 to 12, 15, 16, 18 to 33 and 36 to 38 as well as Comparative Examples 1 to 5 and 9 to 18, methanol (B2) was used in Example 17 and Comparative Example 8, and no organic solvent was used in any of Examples 13, 14, 34, 35 and 39 as well as Comparative Examples 6 and 7. However, the first anion source (the anion source 1A) was substantially also used as the organic solvent, and the titanium precursor and the first anion source (the anion source 1A) were directly mixed in the first step to prepare a titanium precursor solution, in Examples 13, 14, 34, 35 and 39 as well as Comparative Example 7.

As shown in FIGS. 2 and 3, with regard to the first anion source (the anion source 1A), ethyl acetoacetate (C1) was used in Examples 1 to 11 and 13 to 39 as well as Comparative Examples 1 to 5 and 7 to 18, acetic acid (C2) was used in Example 12, and neither the first nor the second anion source was used in Comparative Example 6. In addition, as shown in FIG. 2, with regard to the additional first anion source (the anion source 1B), ammonium nitrate (C3) was used in Examples 9, 10 and 15 to 17 as well as Comparative Examples 5 and 8, tetraethylammonium nitrate (C4) was used in Example 11, and no additional first anion source (no anion source 1B) was used in any of Examples and Comparative Examples other than the above manufactured by the present producing method 1. In addition, as shown in FIG. 3, with regard to the second anion source (the anion source 2), ammonium nitrate (C3) was used in Examples 26 to 32, 34 and 36 to 39 as well as Comparative Examples 13 to 18, tetraethylammonium chloride (C5) was used in Example 33, and acetic acid (C2) was used in Example 35.

As shown in FIGS. 2 and 3, with regard to Examples 15 to 17, 37 and 39 as well as Comparative Example 8, a polyethylene glycol (molecular weight: 35,000) was added as the above-described phase separation inducer before the titanium precursor was added to the mixed solvent of the organic solvent and the first anion source (the anion source 1A) in the first step. In FIGS. 2 and 3, the polyethylene glycol is indicated by the mark D. In any of Examples and Comparative Examples other than Examples 15 to 17, 37 and 39 as well as Comparative Example 8, the above-described phase separation inducer was not added in any of the first and the second steps.

When classifying Examples 1 to 39 and Comparative Examples 1 to 18 based on the presence or absence of the organic solvent, the first anion source(s) (the anion source(s) 1A and/or 1B), the second anion source (the anion source 2), and the phase separation inducer, respectively, these Examples and Comparative Examples are classified into 9 groups as shown in FIG. 6. Each of Examples in Groups 1 to 4 was manufactured by the present producing method 1 (water was used in the second step). Each of Comparative Examples in Groups 1 to 4 was manufactured in the same manner as the present producing method 1 except that at least one of the above-described present temperature control and the molar ratio control was not performed. Each of Examples in Groups 5 to 8 was manufactured by the present producing method 2 (the aqueous solution of the anion was used in the second step). Each of Comparative Examples in Groups 5 to 8 was manufactured in the same manner as the present producing method 2 except that at least one of the above-described present temperature control and the molar ratio control was not performed. Comparative Example 6 in Group 9 was manufactured by the present producing method 1 (water was used in the second step) which omits the first step. In Comparative Example 6 in Group 9, any of the organic solvent, the first anion source(s) (the anion source(s) 1A and/or 1B), the second anion source (the anion source 2) and the phase separation inducer was not used, and the precursor sol was prepared by directly adding water to the titanium precursor (titanium isopropoxide) in the second step.

In Groups 1 to 3, 5 and 6, the organic solvent different from the first anion source (the anion source 1A) was used in the first step. In Groups 4, 7 and 8, the first anion source (the anion source 1A) was also used as the organic solvent in the first step, and no organic solvent different from the first anion source (the anion source 1A) was used separately. In Groups 2 and 3, two kinds of the first anion sources (the anion sources 1A and 1B) were used in the first step of the present producing method 1. In Group 3, the phase separation inducer was used in the first step of the present producing method 1. In Groups 6 and 8, the phase separation inducer was used in the first step of the present producing method 2.

In Group 1, the manufacture was performed by the basic constitution of the present producing method 1. In Group 2, the manufacture was performed by using the additional first anion source (the anion source 1B) in the first step of the basic present producing method 1. In addition, in Group 3, the manufacture was performed by using the additional first anion source (the anion source 1B) and the phase separation inducer in the first step of the basic present producing method 1. In Group 4, the manufacture was performed by using the first anion source (the anion source 1A) also as the organic solvent in the first step of the basic present producing method 1.

In Group 5, the manufacture was performed by the basic constitution of the present producing method 2. In Group 6, the manufacture was performed by using the phase separation inducer in the first step of the basic present producing method 2. In Group 7, the manufacture was performed by using the first anion source (the anion source 1A) also as the organic solvent in the first step of the basic present producing method 1. In Group 8, the manufacture was performed by using the first anion source (the anion source 1A) also as the organic solvent as well as using the phase separation inducer in the first step of the basic present producing method 1.

Next, specific manufacturing procedures and results of representative Examples and Comparative Examples chosen from each of the above-described Groups 1 to 9 are described briefly. With regard to any of Examples and Comparative Examples which is not described hereinbelow, the manufacture may be performed by the same procedure as that of the following Example or Comparative Example classified in the same Group, by modifying raw materials used and their volumes and the like.

Example 1 (Group 1)

Ethyl acetoacetate (an anion source 1A) of 2.1 mL and 1-propanol (an organic solvent) of 3.4 mL were mixed, and titanium(IV) isopropoxide of 5 mL was added to the mixture under stirring. The molar ratio of the first anion source to titanium isopropoxide was 1.05. When titanium isopropoxide was added, heat was generated vigorously. However, the temperature of the solution during the heat generation was lowered to 70° C. by air cooling while the solution was stirred for 3 hours to give a homogeneous titanium precursor solution. Thereafter, 1 mL of water was added dropwise to the solution at a temperature for promoting gelation of 40° C. under stirring. The obtained precursor sol was left to stand still continuously at the temperature for promoting gelation of 40° C. Then, the gelation occurred in 15 seconds to give a transparent wet gel. The obtained wet gel was immersed in 50 mL of an 80% aqueous ethanol solution at 40° C. for 12 hours, and then was immersed in 50 mL of a 50% aqueous ethanol solution in the same manner. Thereafter, the obtained wet gel was immersed in 50 mL of distilled water under the same condition. A gel wetted with distilled water was taken out and was subjected to natural drying. Thereafter, a dried gel was subjected to heat treatment at 300° C. for 2 hours to give a sintered gel.

Comparative Example 3 (Group 1)

Ethyl acetoacetate of 2 mL and 1-propanol of 3.5 mL were mixed, and titanium (IV) isopropoxide of 5 mL was added to the mixture under stirring. The molar ratio of the first anion source to titanium isopropoxide was 1.0. When titanium isopropoxide was added, heat was generated vigorously. However, the temperature of the solution during the heat generation was lowered to 70° C. by air cooling in the same manner as Example 1 while the solution was stirred for 3 hours to give a homogeneous titanium precursor solution. Thereafter, 1 mL of water was added dropwise to the solution at a temperature for promoting gelation of 40° C. under stirring. Then, the gelation occurred in a moment, and precipitates were developed.

Though the present temperature control was performed in the same manner as Example 1, the molar ratio of the first anion source (the anion source 1A) to titanium isopropoxide was 1.0, and the condition of the molar ratio control (being equal to or higher than 1.05) was not satisfied. As a result, no homogeneous gel was obtained.

Example 9 (Group 2)

Figure 7:
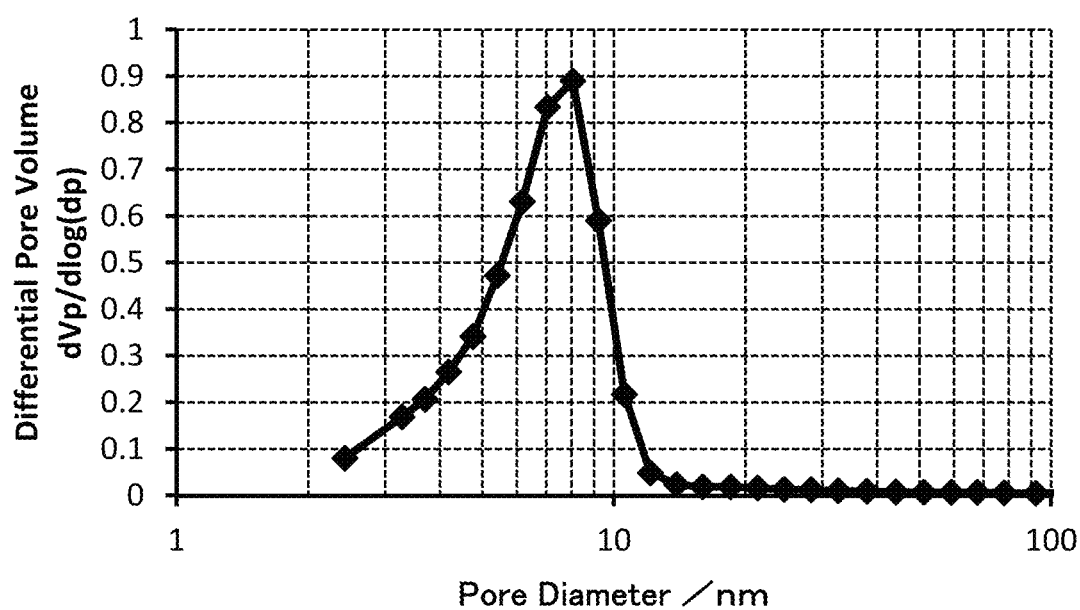
FIG. 7 is a diagram which shows the result of the pore structure analysis of Example 9.

Ethyl acetoacetate (an anion source 1A) of 20 mL and 1-propanol (an organic solvent) of 35 mL were mixed. Titanium (IV) isopropoxide of 50 mL was added to the mixture under stirring to give a homogeneous solution while the temperature of the solution during the heat generation was lowered to 70° C. in the same manner as Example 1 by air cooling. In addition, 0.8 g of ammonium nitrate (an anion source 1B) was added to the solution and the solution was stirred for 3 hours to give a homogeneous titanium precursor solution. The molar ratio of the first anion source (the anion source 1A) to titanium isopropoxide was 1.0, the molar ratio of the first anion source (the anion source 1B) to titanium isopropoxide was 0.05, and the total molar ratio of the first anion sources (the anion sources 1A and 1B) to titanium isopropoxide was 1.05. To the titanium precursor solution, 10 mL of water was added dropwise at a temperature for promoting gelation of 40° C. under stirring. The obtained precursor sol was left to stand still continuously at the temperature for promoting gelation of 40° C. Then, the gelation occurred in 3 minutes to give a transparent wet gel. The obtained wet gel was immersed in 500 mL of an 80% aqueous ethanol solution at 40° C. for 12 hours, and then was immersed in 500 mL of a 50% aqueous ethanol solution in the same manner. Thereafter, the obtained wet gel was immersed in 500 mL of distilled water under the same condition. A gel wetted with distilled water was taken out and was subjected to natural drying. Thereafter, a dried gel was subjected to heat treatment at 300° C. for 2 hours to give a sintered gel. The results of the pore structure analysis of the obtained sintered gel by a nitrogen gas adsorption and desorption method are shown in FIG. 7. It was confirmed that the sintered gel was a monolithic porous body which had a pore diameter peak at 8 nm, and the distribution of pore diameters in the sintered gel was in the range of about 3 to 10 nm. The monolithic porous body had a specific surface area of 203 $m^2/g$ and a pore volume of 0.29 $cm^3/g$.

Comparative Example 5 (Group 2)

Ethyl acetoacetate (an anion source 1A) of 20 mL and 1-propanol (an organic solvent) of 35 mL were mixed, and titanium(IV) isopropoxide of 50 mL was added to the mixture under stirring to give a homogeneous solution. When titanium isopropoxide was added, heat was generated vigorously, but the increase in the temperature of the solution during the heat generation was not suppressed, and therefore, the solvent was boiled during the mixing of the titanium precursor so that about a fifth to a fourth of the solvent decreased. The temperature of the solution was changed at about 90° C. to 95° C. Thereafter, 0.8 g of ammonium nitrate (an anion source 1B) was added to the solution and the solution was stirred for 3 hours to give a titanium precursor solution, and then 10 mL of water was added dropwise to the solution under stirring. At this time, precipitates were developed in the precursor sol such that the sol became opaque, and a homogeneous gel was not obtained. In the same manner as Example 9, the molar ratio of the first anion source (the anion source 1A) to titanium isopropoxide was 1.0, the molar ratio of the first anion source (the anion source 1B) to titanium isopropoxide was 0.05, and the total molar ratio of the first anion sources (the anion sources 1A and 1B) to titanium isopropoxide was 1.05. Accordingly, the condition of the molar ratio control (being equal to or higher than 1.05) was satisfied, but the present temperature control was not performed. As a result, no homogeneous gel was obtained.

Example 15 (Group 3)

Figure 8:
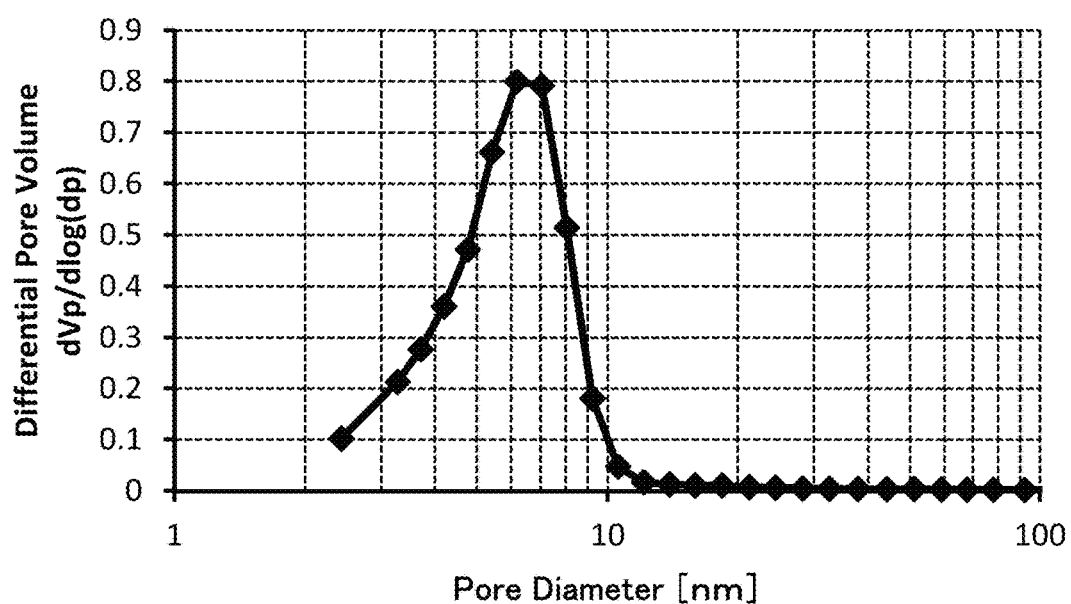
FIG. 8 is a diagram which shows the result of the pore structure analysis of Example 15.
Figure 9:
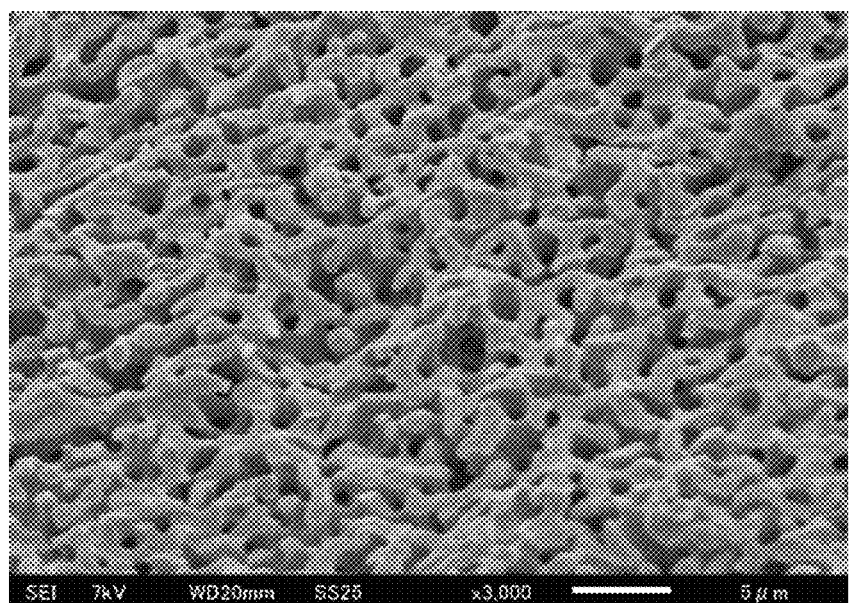
FIG. 9 is an electron micrograph which shows the two-scale hierarchical porous structures of Example 15.

A sintered gel was obtained by the same production procedure as the above-described Example 9 except that 2.5 g of a polyethylene glycol (molecular weight: 35,000) which was a phase separation inducer was mixed before adding titanium isopropoxide in the first step of the present producing method 1. The results of the pore structure analysis of the obtained sintered gel by a nitrogen gas adsorption and desorption method are shown in FIG. 8. It was confirmed that the sintered gel was a monolithic porous body which had a pore diameter peak at 6 nm, and the distribution of pore diameters in the sintered gel was in the range of about 3 to 9 nm. The monolithic porous body had a specific surface area of 215 $m^2/g$ and a pore volume of 0.27 $cm^3/g$. In addition, an electron micrograph of the obtained sintered gel is shown in FIG. 9. From FIG. 9, it can be understood that the sintered gel is a porous body having a co-continuous structure in which the diameter of the skeleton and the diameter of the through hole are about 1 µm, respectively. Considering this result in combination with the results of the pore structure analysis, it was confirmed that the obtained sintered gel was a titania monolithic porous body having two-scale hierarchical porous structures.

Example 16 (Group 3)

Figure 10:
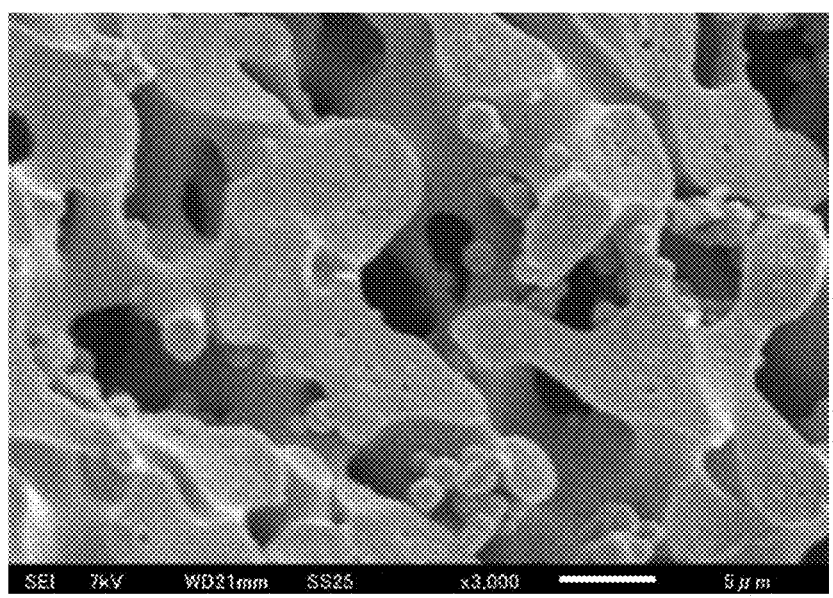
FIG. 10 is an electron micrograph which shows the two-scale hierarchical porous structures of Example 16.

Through holes of a titania monolithic porous body can be adjusted by changing the amount of a phase separation inducer added. A sintered gel was manufactured by the same production procedure as the above-described Example 15 except that the amount of the polyethylene glycol was 3.0 g in the first step of the present producing method 1. An electron micrograph of the obtained sintered gel is shown in FIG. 10. From FIG. 10, it can be understood that the sintered gel is a porous body having a co-continuous structure in which the diameter of the skeleton and the diameter of the through hole is about 2 to 3 µm, respectively. Meanwhile, the pore structure of the obtained sintered gel was the same as the above-described Example 15, and therefore, the description of the results of the analysis is omitted. From the above, it was confirmed that the sintered gel was a titania monolithic porous body having two-scale hierarchical porous structures, and the diameter of the skeleton and the diameter of the through hole in the titania monolithic porous body can be controlled by the amount of the phase separation inducer.

Example 13 (Group 4)

Titanium (IV) isopropoxide of 5 mL was added to ethyl acetoacetate (an anion source 1A) of 5.5 mL under stirring while the temperature of the solution during the heat generation was lowered to 70° C. by air cooling in the same manner as Example 1 to give a homogeneous titanium precursor solution. Thereafter, 1 mL of water was added dropwise to the solution under stirring. The obtained precursor sol was left to stand still at a temperature for promoting gelation of 40° C., and then the gelation occurred in 60 minutes to give a transparent wet gel. The molar ratio of the first anion source to titanium isopropoxide was 2.75.

Example 14 (Group 4)

A sintered gel was obtained by the same production procedure as the above-described Example 13 except that a temperature for promoting gelation was set to 60° C. in the third step of the present producing method 1. The gelation time was reduced from 60 minutes in Example 13 to 10 minutes.

Comparative Example 7 (Group 4)

Titanium(IV) isopropoxide of 5 mL was added to ethyl acetoacetate (an anion source 1A) of 5.5 mL under stirring to prepare a titanium precursor solution. When titanium isopropoxide was added, heat was generated vigorously. However, the increase in the temperature of the solution during the heat generation was not suppressed, and therefore, the solvent was boiled during the mixing of the titanium precursor so that the solvent decreased. The temperature of the solution was changed at about 90° C. to 95° C. After the decrease in the solvent, 1 mL of water was added dropwise to the titanium precursor solution under stirring. Then, precipitates were developed in the precursor sol such that the sol became opaque. The obtained precursor sol was left to stand still at a temperature for promoting gelation of 40° C., but no homogeneous gel was obtained. In the same manner as Example 13, the molar ratio of the first anion source (the anion source 1A) to titanium isopropoxide was 2.75. Accordingly, the condition of the molar ratio control (being equal to or higher than 1.05) was satisfied, but the present temperature control was not performed. As a result, no homogeneous gel was obtained.

Example 28 (Group 5)

Ethyl acetoacetate (an anion source 1A) of 20 mL and 1-propanol (an organic solvent) of 35 mL were mixed. Titanium (IV) isopropoxide of 50 mL was added to the mixture under stirring while the temperature of the solution during the heat generation was lowered to 70° C. by air cooling in the same manner as Example 1 to give a homogeneous titanium precursor solution. In addition, 10 mL of a 1 mol/L aqueous solution of ammonium nitrate was added dropwise to the solution under stirring at a temperature for promoting gelation of 40° C. The obtained precursor sol was left to stand still continuously at the temperature for promoting gelation of 40° C. Then, the gelation occurred in 1 minute to give a transparent wet gel. The molar ratio of the first anion source (the anion source 1A) to titanium isopropoxide was 1.0, the molar ratio of the second anion source (the anion source 2) to titanium isopropoxide was 0.05, and the total molar ratio of the first and the second anion sources (the anion sources 1A and 2) to titanium isopropoxide was 1.05. The obtained wet gel was immersed in 500 mL of an 80% aqueous ethanol solution at 40° C. for 12 hours, and then was immersed in 500 mL of a 50% aqueous ethanol solution in the same manner. Thereafter, the wet gel was immersed in 500 mL of distilled water under the same condition. The gel wetted with distilled water was taken out, and was subjected to natural drying. Thereafter, the dried gel was subjected to the heat treatment at 300° C. for 2 hours to give a sintered gel.

Example 29 (Group 5)

Ethyl acetoacetate of 200 mL and 1-propanol of 350 mL were mixed, and titanium(IV) isopropoxide of 500 mL was added to the mixture under stirring while the temperature of the solution during the heat generation was lowered to 70° C. by a water cooling jacket to give a homogeneous titanium precursor solution. Thereafter, 100 mL of a 1 mol/L aqueous solution of ammonium nitrate was added dropwise to the solution at a temperature for promoting gelation of 40° C. The obtained precursor sol was left to stand still continuously at the temperature for promoting gelation of 40° C. Then, the gelation occurred in 1 minute to give a transparent wet gel. Each molar ratio and the total molar ratio of the first and the second anion sources (the anion sources 1A and 2) to titanium isopropoxide were the same as the above-described Example 28. According to the present producing method, even though the titanium precursor solution prepared in the first step largely increased, a homogeneous titania monolithic porous body was produced.

Comparative Example 13 (Group 5)

Ethyl acetoacetate of 1.5 mL and 1-propanol of 4 mL were mixed, and titanium (IV) isopropoxide of 5 mL was added to the mixture under stirring while the temperature of the solution during the heat generation was lowered to 70° C. by air cooling in the same manner as Example 1 to give a homogeneous titanium precursor solution. Thereafter, 1 mL of a 6 mol/L aqueous solution of ammonium nitrate was added dropwise to the solution at a temperature for promoting gelation of 40° C. The obtained precursor sol was left to stand continuously at the temperature for promoting gelation of 40° C. Then, the gelation occurred in 3 minutes, but acicular crystals were developed and ammonium nitrate (an anion source 2) was precipitated without being dissolved, and no homogeneous gel was obtained. The molar ratio of the first anion source (the anion source 1A) to titanium isopropoxide was 0.75, the molar ratio of the second anion source (the anion source 2) to titanium isopropoxide was 0.3, and the total molar ratio of the first and the second anion sources (the anion sources 1A and 2) to titanium isopropoxide was 1.05. The total molar ratio of the first and the second anion sources, which was 1.05, satisfied the condition of the molar ratio control with regard to the total molar ratio (being equal to or higher than 1.05), but the condition of the molar ratio control with regard to the molar ratio of the second anion source (being lower than 0.3) was not satisfied even though ammonium nitrate (the anion source 2) was hardly soluble to 1-propanol as well as to 2-propanol which was the by-product of the reaction of ethyl acetoacetate with titanium isopropoxide. As a result, no homogeneous gel was obtained.

Example 37 (Group 6)

Ethyl acetoacetate (an anion source 1A) of 2.5 mL and 1-propanol (an organic solvent) of 2.5 mL were mixed, and further, a polyethylene glycol (molecular weight: 35,000) of 0.35 g, which was a phase separation inducer, was mixed. Then, 5 mL of titanium n-isopropoxide was added to the mixture under stirring while the temperature of the solution during the heat generation was lowered to 80° C. by air cooling to give a homogeneous titanium precursor solution. In addition, 1 mL of a 1 mol/L aqueous solution of ammonium nitrate was added dropwise to the solution at a temperature for promoting gelation of 40° C. under stirring. The obtained precursor sol was left to stand still continuously at the temperature for promoting gelation of 40° C. Then, the gelation occurred in 2 minutes to give a transparent wet gel. The obtained wet gel was immersed in 50 mL of an 80% aqueous ethanol solution at 40° C. for 12 hours, and then was immersed in 50 mL of a 50% aqueous ethanol solution in the same manner. Thereafter, the wet gel was immersed in 50 mL of distilled water under the same condition. The gel wetted with distilled water was taken out and was subjected to natural drying. Thereafter, the dried gel was subjected to the heat treatment at 300° C. for 2 hours to give a sintered gel having two-scale hierarchical porous structures. The molar ratio of the first anion source (the anion source 1A) to titanium n-propoxide was 1.2, the molar ratio of the second anion source (the anion source 2) to titanium n-propoxide was 0.05, and the total molar ratio of the first and the second anion sources (the anion sources 1A and 2) to titanium n-propoxide was 1.25. In Example 37, titanium n-isopropoxide was used as a titanium precursor, and therefore, the compound having the lowest boiling point in the titanium precursor solution was 1-propanol having a boiling point of about 97 to 98° C. Accordingly, the boiling of the solvent was avoided only by lowering the temperature of the titanium precursor solution during the heat generation to 80° C.

Example 34 (Group 7)

To 5.5 mL of ethyl acetoacetate (an anion source 1A), 5 mL of titanium (IV) isopropoxide was added under stirring while the temperature of the solution during the heat generation was lowered to 70° C. by air cooling to give a homogeneous titanium precursor solution. Thereafter, 1 mL of a 1 mol/L aqueous solution of ammonium nitrate was added dropwise to the solution under stirring. The obtained precursor sol was left to stand still at a temperature for promoting gelation of 40° C. Then, the gelation occurred after equal to or longer than 180 minutes to give a transparent wet gel. The obtained wet gel was immersed in 50 mL of an 80% aqueous ethanol solution at 40° C. for 12 hours, and then was immersed in 50 mL of a 50% aqueous ethanol solution in the same manner. Thereafter, the gel was immersed in 50 mL of distilled water under the same condition. The gel wetted with distilled water was taken out and was subjected to natural drying, and thereafter, the dried gel was subjected to the heat treatment at 300° C. for 2 hours to give a sintered gel. The molar ratio of the first anion source (the anion source 1A) to titanium isopropoxide was 3, the molar ratio of the second anion source (the anion source 2) to titanium isopropoxide was 0.05, and the total molar ratio of the first and the second anion sources (the anion sources 1A and 2) to titanium isopropoxide was 3.05.

Example 35 (Group 7)

To 2.5 mL of ethyl acetoacetate (an anion source 1A), 5 mL of titanium(IV) isopropoxide was added under stirring while the temperature of the solution during the heat generation was lowered to 70° C. by air cooling to give a homogeneous titanium precursor solution. Thereafter, 1 mL of an aqueous solution of acetic acid which contained 3 g of acetic acid (an anion source 2) was added dropwise to the solution at a temperature for promoting gelation of 40° C. under stirring. The obtained precursor sol was left to stand continuously at the temperature for promoting gelation of 40° C. Then, the gelation occurred in 30 seconds to give a transparent wet gel. The obtained wet gel was immersed in 50 mL of an 80% aqueous ethanol solution at 40° C. for 12 hours, and then was immersed in 50 mL of a 50% aqueous ethanol solution in the same manner. Thereafter, the gel was immersed in 50 mL of distilled water under the same condition. The gel wetted with distilled water was taken out and was subjected to natural drying, and thereafter, the dried gel was subjected to the heat treatment at 300° C. for 2 hours to give a sintered gel. The molar ratio of the first anion source (the anion source 1A) to titanium isopropoxide was 1.25, the molar ratio of the second anion source (the anion source 2) to titanium isopropoxide was 3, and the total molar ratio of the first and the second anion sources (the anion sources 1A and 2) to titanium isopropoxide was 4.25. In Example 35, acetic acid which was the second anion source was soluble to 2-propanol which was the by-product of the reaction of ethyl acetoacetate with titanium isopropoxide, and therefore, the condition of the molar ratio control with regard to the molar ratio of the second anion source (being lower than 0.3) was not required to be satisfied. Accordingly, though the condition was not satisfied, a homogeneous titania monolithic porous body was obtained.

Example 39 (Group 8)

A sintered gel having two-scale hierarchical porous structures was obtained by the same production procedure as the above-described Example 34 except that 0.24 g of a polyethylene glycol (molecular weight: 35,000), which was a phase separation inducer, was mixed in the first step of the present producing method 1 before titanium isopropoxide was added.

A monolithic porous body was obtained.

Comparative Example 6 (Group 9)

To 5 mL of titanium (IV) isopropoxide, 1 mL of water was directly added dropwise under stirring at a temperature for promoting gelation of 40° C. without preparing a titanium precursor solution according to the first step of the present producing method 1 while the temperature of the solution during the heat generation was lowered to 70° C. by air cooling. Then, the gelation occurred in a moment and precipitates were developed. Comparative Example 6 was an extreme Comparative Example in which the condition of the molar ratio control (being equal to or higher than 1.05) was not satisfied.

Next, the validity of each of the control conditions of the present temperature control and the molar ratio control in the present producing methods 1 and 2 is confirmed based on the results of Examples 1 to 39 and Comparative Examples 1 to 18.

First, the control conditions of the present temperature control (the temperature of the titanium precursor solution and the precursor sol is lower than the boiling point of the compound having the lowest boiling point present in the titanium precursor solution) are confirmed. With regard to the present producing method 1, comparing Example 2 and Comparative Example 4, Example 9 and Comparative Example 5, as well as Example 13 and Comparative Example 7, respectively, there is only a difference regarding to the presence or absence of the present temperature control. In Examples 2, 9 and 13, the temperature of the titanium precursor solution and the precursor sol was controlled to 70° C. which was lower than 82.4° C. (the boiling point of 2-propanol) in order to obtain a homogeneous wet gel. On the other hand, in Comparative Examples 4, 5 and 7, the present temperature control was not performed, and therefore, the temperature was increased to 90 to 95° C. which was higher than 82.4° C. (the boiling point of 2-propanol), precipitates were developed, and no homogeneous wet gel was obtained. In addition, comparing Example 9 and Example 10, in Example 9, the temperature of the titanium precursor solution and the precursor sol was controlled to 70° C. which was lower than 82.4° C. (the boiling point of 2-propanol), and in Example 10, the temperature of the titanium precursor solution and the precursor sol was controlled to 80 to 82° C. which was slightly lower than 82.4° C. (the boiling point of 2-propanol). It can be understood that the above-described control conditions of the present temperature control are sufficiently valid. In addition, comparing Example 17 and Comparative Example 8, there is only a difference with regard to the presence or absence of the present temperature control. In Example 17, the temperature of the titanium precursor solution and the precursor sol was controlled to 60° C. which was lower than 64.7° C., which was the boiling point of methanol used as the organic solvent, in order to obtain a homogeneous wet gel. On the other hand, in Comparative Example 8, the present temperature control was not performed, and the temperature increased to over 80° C. which was higher than 64.7° C. (the boiling point of methanol), precipitates were developed, and no homogeneous wet gel was obtained. Further, comparing Example 21 and Comparative Examples 10 and 11, respectively, there are only the differences with regard to the presence or absence of the present temperature control. In Example 21, the temperature of the titanium precursor solution and the precursor sol was controlled to 70° C. which was lower than about 97 to 98° C. (the boiling point of 1-propanol) in order to give a homogeneous wet gel. On the other hand, in Comparative Example 10, the present temperature control was not performed, and therefore, the temperature increased to 95 to 100° C. which was approximately the same temperature as about 97 to 98° C. (the boiling point of 1-propanol), and though the gelation occurred, there was a variation in the gelation time, which made the manufacture unstable and caused the problem in reproducibility. In Comparative Example 11, instead of performing the present temperature control, the temperature of the titanium precursor solution was forcibly maintained at 100° C. for 1 hour, and as a result, even though water was added in the second step, the phase separation occurred, the components were not miscible, no homogeneous sol was generated, and the gelation did not occur. From the results of Comparative Example 10, in a range of the temperature increase from 95 to 100° C., the gelation itself occurred, but the problem in reproducibility was caused. Accordingly, it can be sufficiently expected that the gelation occurs stably by suppressing the temperature increase to around 95° C. It can be understood from the results of Example 21 as well as Comparative Examples 10 and 11 that even in the case when a titanium precursor is titanium n-propoxide, the same control condition is valid.

With regard to the present producing method 2, there is no Comparative Example in which the present temperature control was not performed, and therefore, the similar comparison to the present producing method 1 was not performed. However, when an aqueous solution of an anion is used in the second step, naturally, an exothermic reaction between a titanium precursor and the second anion source occurs in the same manner as the reaction between the titanium precursor and the first anion source in the first step, and therefore, it is apparent that the same by-product is produced. Accordingly, it is clear that the control condition of the present temperature control of the above-described present producing method 1 is valid also in the present producing method 2 as it is.

Next, the control conditions of the molar ratio control are confirmed. The control condition in the present producing method 1 is that a molar ratio of a first anion source to a titanium precursor is made to be equal to or higher than 1.05. The control condition in the present producing method 2 is that a total molar ratio of the first and second anion sources to a titanium precursor is made to be equal to or higher than 1.05. This condition is referred to as the first control condition of the molar ratio control. However, in the present producing method 2, when a second anion source is hardly soluble to an organic solvent (which contains a by-product of the reaction of a titanium precursor and a first anion source), a molar ratio of the second anion source to the titanium precursor is made to be lower than 0.3, and more preferably, is made to be equal to or lower than 0.2. This condition is referred to as the second control condition of the molar ratio control in the present producing method 2.

With regard to the present producing method 1, comparing Examples 1 to 8 and Comparative Examples 1 to 3, the titanium precursor and the organic solvent as well as the first anion source which were used are the same, but the molar ratios of the first anion source to the titanium precursor are different. In Examples 1 to 8, the molar ratio changes in the range of 1.05 to 2.5, and it is found that the gelation time tends to be longer when the molar ratio increases. However, in each of Examples, no precipitates were developed and a homogeneous wet gel was obtained. On the other hand, in Comparative Examples 1 to 3, the molar ratio changes in the range of 0.5 to 1.0, and in each of Comparative Examples 1 to 3, the amount of the first anion source in the first step is small, and therefore, the stabilization of the titanium precursor was insufficient, then the gelation occurred in a moment, and precipitates were also developed. In addition, comparing Examples 18 and 19 to Comparative Example 9, only the molar ratios of the first anion source to the titanium precursor are different. In Examples 18 and 19, the molar ratios are 1.05 and 1.1, and in each of Examples, precipitates were not developed and a homogeneous wet gel was obtained. On the other hand, in Comparative Example 9, the molar ratio is 1.0, then the gelation occurred in a moment, and precipitates were also developed. Further, comparing Examples 22 and 23 to Comparative Example 12, only the molar ratios of the first anion source to the titanium precursor are different. In Examples 22 and 23, the molar ratios are 1.05 and 1.1, and in each of Examples, no precipitates were developed, and a homogeneous wet gel was obtained. On the other hand, in Comparative Example 12, the molar ratio is 1.0, then though the gelation occurred, precipitates were developed in a few seconds, and the gelation progressed while the precipitates were contained, and an extremely heterogeneous wet gel was obtained. From the above results, with regard to each of the cases where titanium isopropoxide, titanium n-propoxide, and titanium ethoxide were used as the titanium precursor, it is apparent that when the molar ratio of the first anion source to the titanium precursor is equal to or higher than 1.05, a homogeneous wet gel was obtained normally, while the molar ratio is 1.0, the gelation became abnormal and a homogeneous wet gel was not obtained.

In the above-described Examples 1 to 8, 18, 19, 22 and 23 as well as Comparative Examples 1 to 3, 9 and 12, one kind of the first anion source, which is ethyl acetoacetate, is used. However, in Examples 9, 10 and 15 to 17, two kinds of the first anion sources, which are ethyl acetoacetate and ammonium nitrate, are used, and though the molar ratio of ethyl acetoacetate to the titanium precursor is 1.0, the molar ratio of ammonium nitrate is 0.05, and then the total molar ratio of the both first anion sources is 1.05, which substantially satisfies the above-described first control condition of the molar ratio control. Accordingly, in each of Examples 9, 10 and 15 to 17, a homogeneous wet gel was obtained normally in the same manner as the above-described Examples 1 to 8, 18, 19, 22 and 23. Ammonium nitrate is hardly soluble to the organic solvent, but when a small amount of ammonium nitrate is used, ammonium nitrate is dissolved in the organic solvent and is capable of reacting with the titanium precursor, and therefore, the deficiency of the main first anion source with the molar ratio of below 1.05 can be compensated. This point is consistent with the results of the present producing method 2 described below.

Next, with regard to the present producing method 2, comparing Examples 26 to 32 and Comparative Examples 13 to 18, though the titanium precursor, the organic solvent, the first and the second anion sources which were used are the same, but each of the molar ratios of the first and the second anion sources to the titanium precursor and the total molar ratio of the first and the second anion sources to the titanium precursor are different. In Examples 26 to 32, the molar ratio of the first anion source to the titanium precursor changes in the range of 0.85 to 1.0, the molar ratio of the second anion source to the titanium precursor changes in the range of 0.05 to 0.2, and the total molar ratio of the first and the second anion sources to the titanium precursor changes in the range of 1.05 to 1.2. It is found in Examples 26 to 32 that the gelation time tends to be longer when the total molar ratio increases. However, in each of Examples 26 to 32, precipitates were not developed and a homogeneous wet gel was obtained. On the other hand, in Comparative Examples 13 to 18, the molar ratio of the first anion source to the titanium precursor changes in the range of 0.65 to 0.9, the molar ratio of the second anion source to the titanium precursor changes in the range of 0.3 to 0.4, and the total molar ratio of the first and the second anion sources to the titanium precursor changes in the range of 1.05 to 1.2. In Comparative Examples 13 to 18, ammonium nitrate which is hardly soluble to the organic solvent is used as the second anion source, and therefore, the second control condition is required to be satisfied in addition to the above-described first control condition of the molar ratio control. However, in each of Comparative Examples 13 to 18, the molar ratio of the second anion source is equal to or higher than 0.3, a part of ammonium nitrate was not completely dissolved and was precipitated, and then acicular crystals were developed. When the amount of the acicular crystals is very small, there is a possibility that the crystals are removed with the solvent phase in the fourth step, but when the amount of the precipitates increases, there is a possibility that the acicular crystals are incorporated into a wet gel. The incorporation of the acicular crystals is a problem because the incorporation is a factor of inhibiting the preparation of a homogeneous wet gel. Accordingly, it is preferable that the molar ratio of the second anion source to the titanium precursor be lowered to be lower than 0.3, and it is more preferable that the molar ratio of the second anion source to the titanium precursor be equal to or lower than 0.2. Meanwhile, in Examples 33 and 35, a compound which is soluble to the organic solvent is used as the second anion source, and therefore, even when the molar ratio of the second anion source to the titanium precursor is equal to or higher than 0.3, the precipitation of the second anion source did not occur. In other words, it can be understood that when a compound which is soluble to the organic solvent is used as the second anion source, the above-described second control condition of the molar ratio control is not required to be satisfied.

In each of Examples 36 and 37 as well as Examples 38 and 39, the titanium precursor is titanium n-prop oxide or titanium ethoxide which is different from the titanium precursor (titanium isopropoxide) used in Examples 26 to 32. However, in each of Examples 36 and 37 as well as Examples 38 and 39, both of the above-described first and the second control conditions of the molar ratio control are satisfied, and then no precipitates were developed and a homogeneous wet gel was obtained in the same manner as Examples 26 to 32. From the above results, it can be understood that in each case where the titanium precursor is titanium isopropoxide, titanium n-propoxide or titanium ethoxide, when the first and the second control conditions of the molar ratio control in the present producing method 2 are satisfied, a homogeneous wet gel is obtained normally. Meanwhile, the cases where the first control condition of the molar ratio control is not satisfied in the present producing method 2 are not confirmed by performing Comparative Example(s). However, Examples 26 to 32 and 36 to 39 include as many as 6 Examples in which the total molar ratio of the first and the second anion sources to the titanium precursor is 1.05, and therefore, it is apparent that the first control condition is valid also in the present producing method 2 by considering the results of the present producing method 1, in particular, the results of Examples 9, 10 and 15 to 17, in combination.

In addition, from the results of Examples 26 to 39 and Comparative Examples 13 to 18, it can be understood that a homogeneous wet gel is obtained normally, when the molar ratio of the first anion source to the titanium precursor is equal to or higher than 0.85 in the present producing method 2. However, from the results, it cannot be necessarily concluded that no homogeneous wet gel can be obtained when the molar ratio of the first anion source to the titanium precursor is lower than 0.85. In other words, for example, even when the molar ratio of the first anion source to the titanium precursor is 0.8, there is a possibility that a homogeneous wet gel can be obtained, for example, by using a compound soluble to the organic solvent as the second anion source and making the molar ratio of the compound to the titanium precursor to be equal to or higher than 0.3.

Other embodiments of the present producing method are described hereinbelow.

<1> In the above-described embodiment, the present producing methods 1 and 2 are described in detail by mainly referring to the cases where ethyl acetoacetate is used as a first anion source and ammonium nitrate is used as a second anion source. However, the first and the second anion sources are not limited to ethyl acetoacetate and ammonium nitrate. The first and the second anion sources which may be used are various coordination compounds which are capable of releasing protons and acting as anions in the reaction with a titanium precursor and are capable of coordinate-bonding to the titanium precursor. This point is also apparent, for example, from the results of Examples 11, 12, 33 and 35 in which anion sources other than ethyl acetoacetate and ammonium nitrate are used, and the anion sources play a desired role.

<2> In addition, in the above-described embodiment, Examples 1 to 8, 13, 14 and 18 to 25 in which ethyl acetoacetate which is soluble to the organic solvent is used as the first anion source in the present producing method 1, as well as Examples 9 to 10 and 15 to 17 in which ethyl acetoacetate and ammonium nitrate which is hardly soluble to the organic solvent are used in combination are illustrated. In the latter Examples, the molar ratio of ethyl acetoacetate to the titanium precursor is fixed to be 1.0, and the molar ratio of ammonium nitrate to the titanium precursor is fixed to be 0.05, and the total molar ratio of ethyl acetoacetate and ammonium nitrate to the titanium precursor is fixed to be 1.05. However, from the results of Examples and Comparative Examples of the present producing method 2, in the case when the first anion source which is supplementarily used in the present producing method 1 is hardly soluble to the organic solvent, it is thought that the second control condition of the molar ratio control of the present producing method 2 is valid as it is. Accordingly, in the present producing method 1, when two kinds of anion sources of which one is soluble to the organic solvent and the other is hardly soluble to the organic solvent are used as the first anion sources, the molar ratio of the anion source, which is hardly soluble to the titanium precursor is preferably lower than 0.3, and is more preferably equal to or lower than 0.2. In addition, the molar ratio of the anion source, which is soluble to the titanium precursor is preferably equal to or higher than 0.85.

<3> In the above-described embodiment, the present producing methods 1 and 2 are described in detail by referring to the cases where each of three kinds of titanium alkoxides, which are titanium n-propoxide, titanium isopropoxide, and titanium ethoxide, is used as a titanium precursor. However, as a titanium alkoxide, a titanium alkoxide having a molecular chain longer than these three kinds (for example, titanium n-butoxide, titanium s-butoxide, titanium t-butoxide, and the like) may also be used as a titanium precursor in the present producing method, because a titanium alkoxide having a molecular chain longer than these three kinds has lower reactivity and is more stable than the above-described three kinds of titanium alkoxides.

Titanium methoxide has a shorter molecular chain and higher reactivity than the above-described three kinds of titanium alkoxides, and therefore, is not stable. Accordingly, it is thought to be difficult to use titanium methoxide as a titanium precursor, and therefore, also in the above-described embodiment, titanium methoxide is excluded from candidates for the titanium precursors. However, with regard to three kinds of titanium alkoxides having different lengths of molecular chains (titanium n-propoxide, titanium isopropoxide and titanium ethoxide), the above-described first control condition of the molar ratio control can be applied in common, and therefore, there is a possibility that the same condition can be applied to titanium methoxide. In addition, there is a possibility that titanium methoxide can be used as the titanium precursor in the present producing method, by relieving the first control condition, in other words, by setting a molar ratio of an anion source to titanium methoxide to be higher than 1.05. Meanwhile, the by-product generated by the reaction of titanium methoxide with an anion source is methanol (boiling point: 64.7° C.). However, since a homogeneous titania gel was manufactured normally in Example 17 in which methanol is used as an organic solvent by making the present temperature control condition to be equal to or lower than 60° C., the present temperature control can be also applied as it is to the case when the titanium precursor is titanium methoxide.

<4> In the above-described embodiment, with regard to the present producing method, Examples in which specific numerical values (volumes, temperatures, time periods and the like) are indicated, are described, but the present producing method is not limited to the conditions of numerical values exemplified in the Examples.

INDUSTRIAL APPLICABILITY

The method for producing the titania monolithic porous body according to the present invention can be utilized for producing a monolithic porous body formed of titania having a three-dimensional continuous network structure by a sol-gel method which uses various titanium alkoxides as titanium precursors.

The invention claimed is:
1. A method for producing a monolithic porous body formed of titania having a three-dimensional continuous network structure by using a sol-gel method, the method comprising:
   a first step for preparing a titanium precursor solution including a titanium precursor, a first anion source and an organic solvent;
   a second step for preparing a sol by adding water or an aqueous solution containing a second anion source to the titanium precursor solution to initiate a hydrolysis reaction and a polycondensation reaction;
   a third step for forming a co-continuous structure of a titania hydrogel phase and a solvent phase by maintaining the sol at a predetermined temperature for promoting gelation such that sol-gel transition and phase separation occur in parallel by progress of the hydrolysis reaction and the polycondensation reaction; and
   a fourth step for removing the solvent phase from the co-continuous structure;
   wherein the titanium precursor is a titanium alkoxide other than titanium methoxide,
   wherein the first and the second anion sources are compounds that release protons in the reaction with the titanium precursor and act as anions that coordinate-bond to the titanium precursor,
   wherein a temperature of the titanium precursor solution and the sol is maintained at a temperature lower than the boiling point of the compound having the lowest boiling point present in the titanium precursor solution throughout the first, second and third steps,
   wherein when water is added to the titanium precursor solution in the second step, a blending amount of the first anion source is set such that a molar ratio of the first anion source to the titanium precursor is equal to or higher than 1.05,
   and wherein when the aqueous solution containing the second anion source is added to the titanium precursor solution in the second step, a blending amount of the first anion source and the second anion source is set such that a molar ratio of the first anion source and the second anion source in total to the titanium precursor is equal to or higher than 1.05.
2. The method for producing the monolithic porous body according to claim 1, wherein the titanium precursor comprises at least one of titanium n-propoxide, titanium isopropoxide, and titanium ethoxide.

3. The method for producing the monolithic porous body according to claim 1, wherein the titanium precursor comprises at least one of titanium isopropoxide and titanium ethoxide.

4. The method for producing the monolithic porous body according to claim 1, wherein when the aqueous solution containing the second anion source is added to the titanium precursor solution in the second step, a blending amount of the first anion source and the second anion source is set such that a molar ratio of the first anion source and the second anion source in total to the titanium precursor is equal to or higher than 1.05, provided that when the second anion source is hardly soluble to the organic solvent, the blending amount is set such that a molar ratio of the second anion source to the titanium precursor is equal to or lower than 0.2.

5. The method for producing the monolithic porous body according to claim 1, wherein when the aqueous solution containing the second anion source is added to the titanium precursor solution in the second step, a blending amount of the first anion source and the second anion source is set such that a molar ratio of the first anion source and the second anion source in total to the titanium precursor is equal to or higher than 1.05, and that a molar ratio of the first anion source to the titanium precursor is equal to or higher than 0.85.

6. The method for producing the monolithic porous body according to claim 1, wherein the first anion source comprises the organic solvent in the first step.

7. The method for producing the monolithic porous body according to claim 1, wherein the titanium precursor solution is prepared by adding the titanium precursor to a mixed solvent of the organic solvent and the first anion source in the first step.

8. The method for producing the monolithic porous body according to claim 1, wherein a co-existing substance that has an action of evoking sol-gel transition and spinodal decomposition type phase separation in parallel is added to the organic solvent in the first step.

9. The method for producing the monolithic porous body according to claim 1,
wherein the first anion source is a first type coordination compound that is soluble to the organic solvent and is hardly soluble to water, or a second type coordination compound that is soluble to both of the organic solvent and water; and
wherein the second anion source is the second type coordination compound or a third type coordination compound that is hardly soluble to the organic solvent and is soluble to water.

10. The method for producing the monolithic porous body according to claim 1, wherein the first anion source comprises a β-diketone compound, a carboxylic acid, or an isomer or a complex thereof.

11. The method for producing the monolithic porous body according to claim 1, wherein the second anion source is hardly soluble to the organic solvent, and the blending amount is set such that a molar ratio of the second anion source to the titanium precursor does not exceed 0.3.

\* \* \* \* \*